United States Patent
Gao et al.

(10) Patent No.: US 11,968,672 B2
(45) Date of Patent: Apr. 23, 2024

(54) METHOD AND APPARATUS FOR TRANSMITTING UPLINK CONTROL INFORMATION

(71) Applicant: China Academy of Telecommunications Technology, Beijing (CN)

(72) Inventors: Xuejuan Gao, Beijing (CN); Ekpenyong Tony, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 130 days.

(21) Appl. No.: 17/044,329

(22) PCT Filed: Feb. 27, 2019

(86) PCT No.: PCT/CN2019/076358
§ 371 (c)(1),
(2) Date: Oct. 1, 2020

(87) PCT Pub. No.: WO2019/192272
PCT Pub. Date: Oct. 10, 2019

(65) Prior Publication Data
US 2021/0160855 A1 May 27, 2021

(30) Foreign Application Priority Data
Apr. 4, 2018 (CN) .......................... 201810301153.8

(51) Int. Cl.
*H04W 72/21* (2023.01)
*H04W 72/0446* (2023.01)
*H04W 72/1268* (2023.01)

(52) U.S. Cl.
CPC ....... *H04W 72/21* (2023.01); *H04W 72/0446* (2013.01); *H04W 72/1268* (2013.01)

(58) Field of Classification Search
CPC ... H04L 1/1854; H04L 1/1858; H04L 5/0053; H04L 5/0055; H04L 5/0094
See application file for complete search history.

(56) References Cited

U.S. PATENT DOCUMENTS

| | | | |
|---|---|---|---|
| 2012/0113831 | A1 | 5/2012 | Pelletier et al. |
| 2016/0021653 | A1 | 1/2016 | Papasakellariou et al. |

(Continued)

FOREIGN PATENT DOCUMENTS

| | | | |
|---|---|---|---|
| CN | 102237985 | A | 11/2011 |
| CN | 102468917 | A | 5/2012 |

(Continued)

OTHER PUBLICATIONS

3GPP TS 38.212 V15.0.0, 3rd Generation Partnership Project;Technical Specification Group Radio Access Network; NR;Multiplexing and channel coding, Release 15, total 82 pages, Dec. 2017.

(Continued)

*Primary Examiner* — Bo Hui A Zhu
(74) *Attorney, Agent, or Firm* — Kilpatrick Townsend & Stockton LLP

(57) ABSTRACT

The present application discloses a method and an apparatus for transmitting uplink control information (UCI), to resolve the issue of repeated transmissions of UCI in the prior art. In an embodiment of the present application, a terminal determines a bit sequence of coded UCI of a first transmission, the UCI being repeatedly transmitted on a PUCCH, and the terminal transmits the bit sequence of the coded UCI in a determined uplink channel in each subsequent retransmission of the UCI. A network side apparatus uses the same method to determine a bit sequence of coded UCI of a first transmission, and receives, via a determined uplink channel, a repeatedly transmitted bit sequence of the coded UCI. In the embodiments of the present application, a bit sequence (Continued)

of coded UCI is determined according to a channel of the UCI in a first transmission time slot.

14 Claims, 5 Drawing Sheets

(56) References Cited

U.S. PATENT DOCUMENTS

| | | | |
|---|---|---|---|
| 2016/0381674 A1 | 12/2016 | Kim et al. | |
| 2018/0176909 A1* | 6/2018 | Wikström | H04L 1/0026 |
| 2019/0052421 A1* | 2/2019 | Yin | H04L 5/0091 |
| 2020/0344781 A1* | 10/2020 | Li | H04W 72/042 |

FOREIGN PATENT DOCUMENTS

| | | |
|---|---|---|
| CN | 103220083 A | 7/2013 |
| CN | 106160956 A | 11/2016 |
| CN | 107027181 A | 8/2017 |
| WO | 2017218749 A1 | 12/2017 |

OTHER PUBLICATIONS

3GPP TS 38.213 V15.0.0, 3rd Generation Partnership Project;Technical Specification Group Radio Access Network; NR;Physical layer procedures for control, Release 15, total 54 pages, Dec. 2017.
Ericsson, "Correction on UCI multiplexing on PUSCH", 3GPP TSG-RAN WG1 Meeting #85, Nanjing, China, May 23-27, 2016, total 5 pages, R1-165791.
Qualcomm Incorporated, "Remaining issues for multiplexing UCI on PUSCH", 3GPP TSG RAN WG1 Meeting #92, Athens, Greece, Feb. 26-Mar. 2, 2018, total 13 pages, R1-1802839.

* cited by examiner

UCI repetition transmission

METHOD AND APPARATUS FOR TRANSMITTING UPLINK CONTROL INFORMATION

The present application is a national phase entry under 35 U.S.C. § 371 of International Application No. PCT/CN2019/076358, filed on Feb. 27, 2019, which claims the priority from Chinese Patent Application No. 201810301153.8, filed with the China National Intellectual Property Administration on Apr. 4, 2018 and entitled "Method and Apparatus for Transmitting Uplink Control Information", which is hereby incorporated by reference in its entirety.

FIELD

The present application relates to the field of communication technologies, and particularly to a method and apparatus for transmitting uplink control information.

BACKGROUND

At present, in the NR (New Radio), the communication system does not support the parallel transmissions of the Physical Uplink Control Channel (PUCCH) and Physical Uplink Shared Channel (PUSCH) at the same time. As such, it is necessary to transmit the Uplink Control Information (UCI) including HARQ-ACK (Hybrid Automatic Repeat Request-Acknowledgement) on the PUSCH by multiplexing with the data.

When the UCI is transmitted on the PUSCH by multiplexing, a clear mapping rule has been defined. For example, the HARQ-ACK is mapped sequentially first in frequency domain and then in time domain after the first DMRS (Demodulation Reference Symbol); the CSI (Channel State information) part 1 and CSI part 2 are mapped first in frequency domain and then in time domain starting from the first available RE (Resource Element) resource; if the RE resources occupied by the UCI do not fill an entire OFDM (Orthogonal Frequency Division Multiplexing) symbol or the RE resources occupied by the UCI are more than one symbol but all RE resources on the PUSCH bandwidth cannot be occupied on the last symbol, then the mappings are discrete uniformly in the frequency domain. For example, when the UCI resources do not fill one symbol, the frequency-domain interval is the number of REs available on the symbol/the number of unmapped UCI symbols that is rounded down. If the number of bits of the HARQ-ACK is 0 or 1 or 2, some resources are reserved, and the CSI part 1 may not be mapped on the reserved RE resources, mainly to avoid the HARQ-ACK from puncturing the CSI part 1.

The current NR communication system supports the repeated PUCCH transmission, that is, the PUCCH occupies multiple slots for transmission, where the same UCI is transmitted in each slot to obtain the soft merging gain, and the PUCCH has the same transmission resources in each repeated transmission slot. At the same time, the NR communication system also supports the repeated PUSCH transmission. The same data information is transmitted in each slot to obtain the soft merging gain, and the PUSCH has the same transmission resources in each repeated transmission slot.

In the prior art, in a case that a PUSCH without repetition transmission or a PUSCH among multiple repetition transmission of the PUSCH collides with a PUCCH in the same slot, if the start symbols of the PUCCH and PUSCH are the same in the collision slot, the UCI is multiplexed in the PUSCH for transmission and the PUCCH is not transmitted. However, when a PUCCH with repeated transmission collides with a PUSCH in the same slot, there is no clear method on how to transmit the UCI.

In summary, in the prior art, when a PUCCH with repeated transmission collides with a PUSCH in the same slot, there is no clear method on how to transmit the UCI.

SUMMARY

The present application provides a method and apparatus for transmitting uplink control information, to solve the problem in the prior art that there is no definite method for transmitting the UCI.

In a first aspect, a terminal determines an encoded UCI bit sequence in a first transmission of UCI repetition transmission, and transmits the encoded UCI bit sequence on a determined uplink channel in each of subsequent repetition transmissions of the UCI. Where the UCI is configured with repetition transmission using a PUCCH.

In the embodiment of the present application, since the terminal determines the encoded UCI bit sequence based on the carrying channel of the UCI in the first transmission slot, the encoded UCI bit sequence is transmitted no matter which channel is used for transmission subsequently, which can ensure that the network-side device merges the repetition transmission of the UCI correctly and improve the UCI transmission performance.

In some embodiments, in a case that there is a time-domain overlapping between a PUSCH and a PUCCH for carrying the UCI during the first transmission of the UCI repetition transmission, and it is determined that the UCI is transmitted on the PUSCH, the encoded UCI bit sequence in the first transmission is determined based on a transmission resource for transmitting the UCI on the PUSCH; or in a case that there is a time-domain overlapping between a PUSCH and a PUCCH for carrying the UCI during the first transmission of the UCI repetition transmission, and it is determined that the UCI is transmitted on the PUCCH, the encoded UCI bit sequence in the first transmission is determined based on a transmission resource for transmitting the UCI on the PUCCH; or in a case that during the first transmission of the UCI repetition transmission, the UCI is determined to be transmitted on a PUCCH for the UCI repetition transmission, and the encoded UCI bit sequence in the first transmission is determined based on a transmission resource for transmitting the UCI on the PUCCH.

Here, the method of determining the uplink channel for transmitting the encoded UCI bit sequence is as follows:

if no PUSCH exits during a repetition transmission of the UCI, the terminal determines a PUCCH for the UCI repetition transmission as the uplink channel for transmitting the encoded UCI bit sequence; or if there is a time-domain overlapping between a PUSCH and a PUCCH for the UCI repetition transmission during a repetition transmission of the UCI, and a start symbol of the PUCCH is aligned with or ahead of a start symbol of the PUSCH, the terminal determines the PUSCH as the uplink channel for transmitting the encoded UCI bit sequence; or if there is a time-domain overlapping between a PUSCH and a PUCCH for the UCI repetition transmission during a repetition transmission of the UCI, and a start symbol of the PUCCH is behind a start symbol of the PUSCH, the terminal determines the PUCCH as the uplink channel for transmitting the encoded UCI bit sequence.

In the embodiment of the present application, the encoded UCI bit sequence in first transmission is determined according to the transmission condition of the current uplink channel, thus ensuring that the encoded UCI bit sequence in first transmission is more adapted to the transmission condition of the uplink channel, and improving the UCI transmission performance.

In some embodiments, if the transmission resource required by the encoded UCI bit sequence is larger than the transmission resource for transmitting the UCI on the determined uplink channel, the terminal performs truncation processing on the encoded UCI bit sequence; or if the transmission resource required by the encoded UCI bit sequence is smaller than the transmission resource for transmitting the UCI on the determined uplink channel, the terminal performs repeat processing on the encoded UCI bit sequence.

In the embodiment of the present application, when the encoded UCI bit sequence is transmitted on the determined uplink channel, the transmission resources required by the encoded UCI bit sequence may be compared with the transmission resources for transmitting the UCI on the determined uplink channel, and the encoded UCI bit sequence is truncated or repeated according to the comparison result, ensuring the accurate transmission of the encoded UCI bit sequence and improving the UCI transmission performance.

In a second aspect, a network-side device determines an encoded UCI bit sequence in a first transmission of UCI repetition transmission; and receives the encoded UCI bit sequence on a determined uplink channel in each of subsequent repetition transmissions of the UCI. The UCI is configured with repetition transmission using a PUCCH.

In the embodiment of the present application, the encoded UCI bit sequence in first transmission is determined according to the transmission condition of the current uplink channel, thus ensuring that the encoded UCI bit sequence in first transmission is more adapted to the transmission condition of the uplink channel, and improving the UCI transmission performance.

In some embodiments, if there is a time-domain overlapping between a Physical Uplink Shared Channel, PUSCH, and a PUCCH for carrying the UCI during the first transmission of the UCI repetition transmission, and it is determined that the UCI is transmitted on the PUSCH, it is determined that the encoded UCI bit sequence in the first transmission is determined based on a transmission resource for transmitting the UCI on the PUSCH; or if there is a time-domain overlapping between a PUSCH and a PUCCH for carrying the UCI during the first transmission of the UCI repetition transmission, and it is determined that the UCI is transmitted on the PUCCH, it is determined that the encoded UCI bit sequence in the first transmission is determined based on a transmission resource for transmitting the UCI on the PUCCH; or no PUSCH exits during the first transmission of the UCI repetition transmission, it is determined that the UCI is transmitted on a PUCCH for the UCI repetition transmission, and that the encoded UCI bit sequence in the first transmission is determined based on a transmission resource for transmitting the UCI on the PUCCH.

Here, the method of determining the uplink channel for transmitting the encoded UCI bit sequence is as follows:

if no PUSCH exits during a repetition transmission of the UCI, the terminal determines a PUCCH for the UCI repetition transmission as the uplink channel for receiving the encoded UCI bit sequence; or if there is a time-domain overlapping between a PUSCH and a PUCCH for the UCI repetition transmission during a repetition transmission of the UCI, and a start symbol of the PUCCH is aligned with or ahead of a start symbol of the PUSCH, the terminal determines the PUSCH as the uplink channel for transmitting the encoded UCI bit sequence; or if there is a time-domain overlapping between a PUSCH and a PUCCH for the UCI repetition transmission during a repetition transmission of the UCI, and a start symbol of the PUCCH is behind a start symbol of the PUSCH, the terminal determines the PUCCH as the uplink channel for transmitting the encoded UCI bit sequence.

In the embodiment of the present application, the encoded UCI bit sequence in first transmission is determined according to the transmission condition of the current uplink channel, thus ensuring that the encoded UCI bit sequence in first transmission is more adapted to the transmission condition of the uplink channel, and improving the UCI transmission performance.

In some embodiments, if the transmission resource required by the encoded UCI bit sequence is larger than the transmission resource for transmitting the UCI on the determined uplink channel, the network-side device performs merge processing on the encoded UCI bit sequence; or if the transmission resource required by the encoded UCI bit sequence is smaller than the transmission resource for transmitting the UCI on the determined uplink channel, the network-side device performs deduplication processing on the encoded UCI bit sequence.

In the embodiment of the present application, since the encoded UCI bit sequence may be merged and deduplicated according to a comparison result, ensuring the accurate transmission of the encoded UCI bit sequence and improving the UCI transmission performance.

In a third aspect, an apparatus for transmitting uplink control information is provided. The apparatus may be a terminal that includes a processor and a memory. The processor is configured to read a program in the memory and perform: determining an encoded UCI bit sequence in a first transmission of UCI repetition transmission, the UCI being configured with repetition transmission using a PUCCH, and transmitting the encoded UCI bit sequence on a determined uplink channel in each of subsequent repetition transmissions of the UCI.

In some embodiments, the processor is further configured to perform:

in a case that there is a time-domain overlapping between a PUSCH, and a PUCCH for carrying the UCI during the first transmission of the UCI repetition transmission, and it is determined that the UCI is transmitted on the PUSCH, determining the encoded UCI bit sequence in the first transmission based on a transmission resource for transmitting the UCI on the PUSCH; or in a case that there is a time-domain overlapping between a PUSCH and a PUCCH for carrying the UCI during the first transmission of the UCI repetition transmission, and it is determined that the UCI is transmitted on the PUCCH, determining the encoded UCI bit sequence in the first transmission based on a transmission resource for transmitting the UCI on the PUCCH; or in a case that no PUSCH exits during the first transmission of the UCI repetition transmission, determining that the UCI is transmitted on a PUCCH for the UCI repetition transmission, and determining the encoded UCI bit sequence in the first transmission based on a transmission resource for transmitting the UCI on the PUCCH.

In some embodiments, the processor is configured to perform:

if a transmission resource required by the encoded UCI bit sequence is larger than a transmission resource for transmitting the UCI on the determined uplink channel, performing truncation processing on the encoded UCI bit sequence;

or if the transmission resource required by the encoded UCI bit sequence is smaller than the transmission resource for transmitting the UCI on the determined uplink channel, performing repeat processing on the encoded UCI bit sequence.

In some embodiments, the processor is specifically configured to perform:

if no PUSCH exits during a repetition transmission of the UCI, determining a PUCCH for the UCI repetition transmission as the uplink channel for transmitting the encoded UCI bit sequence; or if there is a time-domain overlapping between a PUSCH and a PUCCH for the UCI repetition transmission during a repetition transmission of the UCI, and a start symbol of the PUCCH is aligned with or ahead of a start symbol of the PUSCH, determining the PUSCH as the uplink channel for transmitting the encoded UCI bit sequence; or if there is a time-domain overlapping between a PUSCH and a PUCCH for the UCI repetition transmission during a repetition transmission of the UCI, and a start symbol of the PUCCH is behind a start symbol of the PUSCH, determining the PUCCH as the uplink channel for transmitting the encoded UCI bit sequence.

In a fourth aspect, an apparatus for transmitting uplink control information is provided. The apparatus may be a network-side device that includes a processor and a memory. The processor is configured to read a program in the memory and perform:

determining an encoded UCI bit sequence in a first transmission of UCI repetition transmission, where the UCI is configured with repetition transmission using a PUCCH; and receiving the encoded UCI bit sequence on a determined uplink channel in each of subsequent repetition transmissions of the UCI.

In some embodiments, the processor is further configured to perform:

in a case that there is a time-domain overlapping between a Physical Uplink Shared Channel, PUSCH, and a PUCCH for carrying the UCI during the first transmission of the UCI repetition transmission, and it is determined that the UCI is transmitted on the PUSCH, determining that the encoded UCI bit sequence in the first transmission is determined based on a transmission resource for transmitting the UCI on the PUSCH; or in a case that there is a time-domain overlapping between a PUSCH and a PUCCH for carrying the UCI during the first transmission of the UCI repetition transmission, and it is determined that the UCI is transmitted on the PUCCH, determining that the encoded UCI bit sequence in the first transmission is determined based on a transmission resource for transmitting the UCI on the PUCCH; or in a case that no PUSCH exits during the first transmission of the UCI repetition transmission, determining that the UCI is transmitted on a PUCCH for the UCI repetition transmission, and determining that the encoded UCI bit sequence in the first transmission is determined based on a transmission resource for transmitting the UCI on the PUCCH.

In some embodiments, the processor is specifically configured to perform:

if a transmission resource required by the encoded UCI bit sequence is larger than a transmission resource for transmitting the UCI on the determined uplink channel, performing merge processing on the encoded UCI bit sequence; or if a transmission resource required by the encoded UCI bit sequence is smaller than a transmission resource for transmitting the UCI on the determined uplink channel, performing deduplication processing on the encoded UCI bit sequence.

In some embodiments, the processor is specifically configured to perform:

if no PUSCH exits during a repetition transmission of the UCI, determining a PUCCH for the UCI repetition transmission as the uplink channel for receiving the encoded UCI bit sequence; or if there is a time-domain overlapping between a PUSCH and a PUCCH for the UCI repetition transmission during a repetition transmission of the UCI, and a start symbol of the PUCCH is aligned with or ahead of a start symbol of the PUSCH, determining the PUSCH as the uplink channel for receiving the encoded UCI bit sequence; or if there is a time-domain overlapping between a PUSCH and a PUCCH for the UCI repetition transmission during a repetition transmission of the UCI, and a start symbol of the PUCCH is behind a start symbol of the PUSCH, determining the PUCCH as the uplink channel for receiving the encoded UCI bit sequence.

In a fifth aspect, an apparatus for transmitting uplink control information is provided. The apparatus may be a terminal that includes:

a first determining device configured to determine an encoded UCI bit sequence in a first transmission of UCI repetition transmission, and the UCI is configured with repetition transmission using a PUCCH;

a sending device configured to transmit the encoded UCI bit sequence on a determined uplink channel in each of subsequent repetition transmissions of the UCI.

In a sixth aspect, an apparatus for transmitting uplink control information is provided. The apparatus may be a network-side device that includes:

a second determining device configured to determine an encoded UCI, bit sequence in a first transmission of UCI repetition transmission, and the UCI is configured with repetition transmission using a PUCCH;

a receiving device configured to receive the encoded UCI bit sequence on a determined uplink channel in each of subsequent repetition transmissions of the UCI.

In a seventh aspect, a readable storage medium includes program codes, which are configured, when running on a computing device, to cause the computing device to perform the steps of any method of the above-mentioned apparatus.

BRIEF DESCRIPTION OF THE DRAWINGS

Embodiments of the present application more clearly, the accompanying figures which need to be used in describing the embodiments will be introduced below briefly.

DETAILED DESCRIPTION OF THE EMBODIMENTS

The embodiments of the present application are applied to the scenarios in which the uplink control information is transmitted in the NR communication system. The current NR communication system supports the repeated PUCCH transmission, that is, the PUCCH occupies multiple slots for transmission, where the same UCI is transmitted in each slot to obtain the soft merging gain, and the PUCCH has the same transmission resources in each repeated transmission slot. At the same time, the NR communication system also supports the repeated PUSCH transmission. The same data information is transmitted in each slot to obtain the soft merging gain, and the PUSCH has the same transmission resources in each repeated transmission slot.

When a PUSCH without repetition transmission or a PUSCH among multiple repetition transmission of the PUSCH collides with a PUCCH in the same slot, the UCI multiplexing in PUSCH for transmission is supported and the PUCCH is not transmitted if the start symbols of the PUCCH and PUSCH are the same in the collision slot. However, when a PUCCH with repeated transmission collides with a PUSCH in the same slot, there is no clear method on how to transmit the UCI. Based on this, an embodiment of the present application provides a method for transmitting uplink control information, which will be described in detail below.

Figure 1:
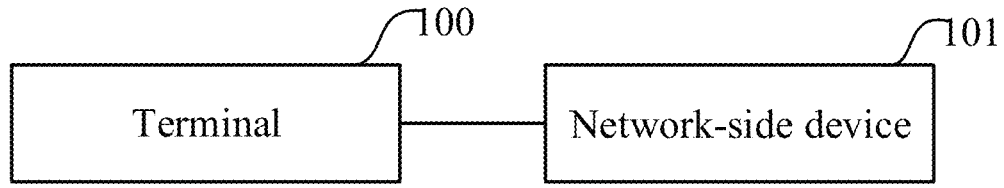
FIG. 1 is a schematic structural diagram of a system for transmitting uplink control information in an embodiment of the present application.

As shown in FIG. 1, an embodiment of the present application provides a system for transmitting uplink control information. The system includes: a terminal 100 and a network-side device 101.

The terminal 100 is configured to determine an encoded UCI bit sequence in a first transmission of UCI repetition transmission, the UCI being configured with repetition transmission using a PUCCH, and transmit the encoded UCI bit sequence on a determined uplink channel in each of subsequent repetition transmissions of the UCI.

The network-side device 101 is configured to determine an encoded UCI bit sequence in a first transmission of UCI repetition transmission, where the UCI is configured with repetition transmission using a PUCCH, and receive the encoded UCI bit sequence on a determined uplink channel in each of subsequent repetition transmissions of the UCI. In some embodiments, the network-side device may be a base station.

In the embodiment of the present application, the terminal determines the encoded UCI bit sequence in first transmission among the UCI repetition transmission, and transmits the encoded UCI bit sequence on the determined uplink channel in each of subsequent repetition transmissions of the UCI. Where the UCI is configured with repetition transmission using a PUCCH. The network-side device may also determine the encoded UCI bit sequence in first transmission by using the same method, and receive encoded UCI bit sequence repeatedly transmitted through the determined uplink channel. In the embodiment of the present application, since the encoded UCI bit sequence is determined according to the carrying channel of the UCI in the first transmission slot, and the same is transmitted no matter which channel is used for subsequent transmissions, the network-side device can merge the repetition transmission of the UCI correctly and improve the UCI transmission performance.

In a specific implementation, in a case that there is a time-domain overlapping between a PUSCH and the PUCCH for carrying the UCI during the first transmission of the UCI repetition transmission, the terminal firstly needs to determine on which uplink channel the encoded UCI bit sequence is transmitted in each of subsequent repetition transmissions of the UCI.

Figure 2:
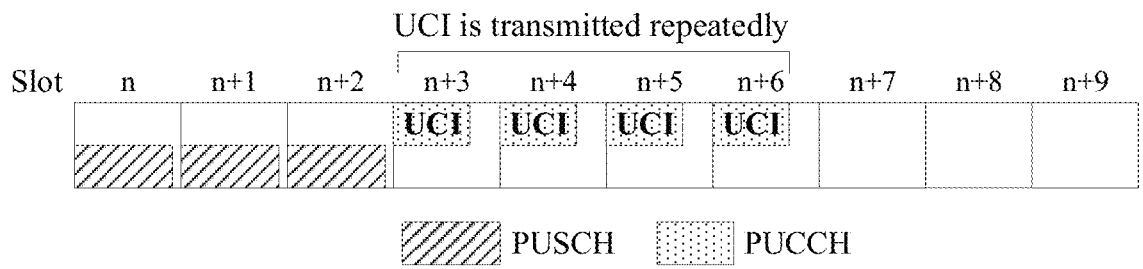
FIG. 2 is a schematic diagram of a situation in which a PUCCH is determined as the uplink channel for transmitting the encoded UCI bit sequence in an embodiment of the present application.

As shown in FIG. 2, one case is: if no PUSCH exits during a repetition transmission of the UCI, the terminal determines the PUCCH as the uplink channel for transmitting the encoded UCI bit sequence.

Figure 3A:
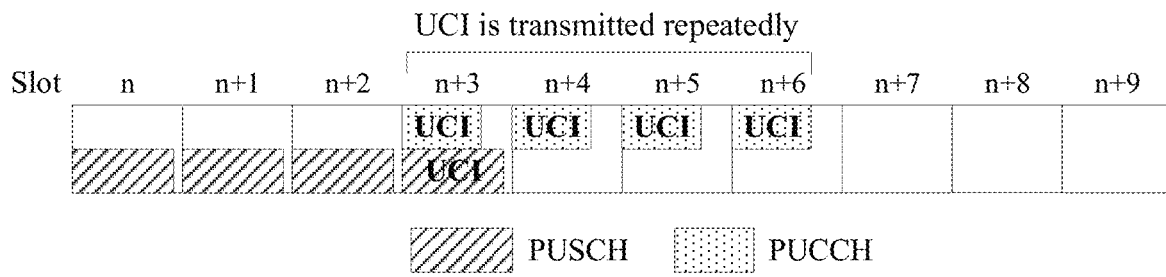
FIG. 3A is a first schematic diagram of determining the PUSCH as the uplink channel for transmitting the encoded UCI bit sequence in an embodiment of the present application.

As shown in FIG. 3A, another case is: if there is a time-domain overlapping between the PUSCH and the PUCCH during the transmission and the start symbol of the PUCCH is aligned with or ahead of the start symbol of the PUSCH, the terminal determines the PUSCH as the uplink channel for transmitting the encoded UCI bit sequence at this time.

Figure 3B:
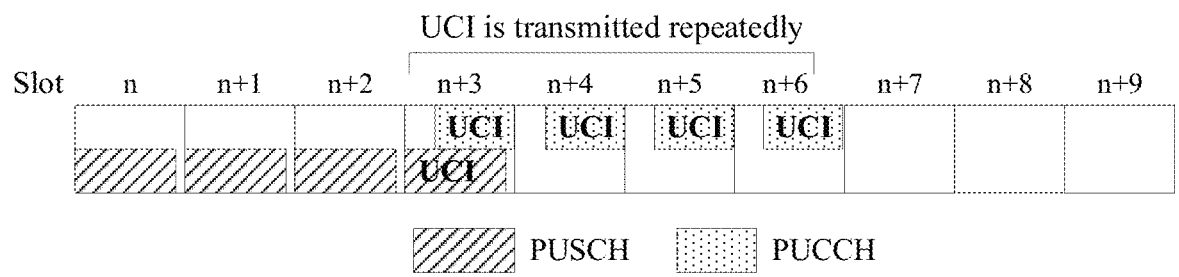
FIG. 3B is a second schematic diagram of determining the PUSCH as the uplink channel for transmitting the encoded UCI bit sequence in an embodiment of the present application.

As shown in FIG. 3B, the last case is: if there is a time-domain overlapping between the PUSCH and the PUCCH during the transmission and the start symbol of the PUCCH is behind the start symbol of the PUSCH, the terminal determines the PUCCH as the uplink channel for transmitting the encoded UCI bit sequence.

After the terminal determines uplink channel for transmitting the encoded UCI bit sequence, there is a need to determine the encoded UCI bit sequence in first transmission among the UCI repetition transmission according to the determined uplink channel, where the PUCCH is used to carry the UCI and configured to be transmitted in multiple slots.

If there is a time-domain overlapping between the PUSCH and the PUCCH during the first transmission of the UCI and it is determined that the UCI is transmitted on the PUSCH, the encoded UCI bit sequence in first transmission needs to be determined according to the transmission resources for transmitting the encoded UCI bit sequence on the PUSCH.

Secondly, if there is a time-domain overlapping between the PUSCH and the PUCCH during the first transmission of the UCI and it is determined that the UCI is transmitted on the PUCCH, the encoded UCI bit sequence in first transmission needs to be determined according to the transmission resources for transmitting the encoded UCI bit sequence on the PUCCH.

Finally, if there is no PUSCH during the first transmission of the UCI and it is determined that the UCI is transmitted on the PUCCH, the encoded UCI bit sequence in first transmission is determined according to the transmission resources for transmitting the UCI on the PUCCH.

After the terminal determines the encoded UCI bit sequence in first transmission, it transmits the encoded UCI bit sequence over the determined uplink channel.

For example, if the terminal determines the PUCCH as the uplink channel for transmitting the encoded UCI bit sequence, the encoded UCI bit sequence is transmitted on the PUCCH; if the terminal determines the PUSCH as the uplink channel for transmitting the encoded UCI bit sequence, the encoded UCI bit sequence is transmitted repeatedly on the PUSCH.

Correspondingly, the network-side device receives the encoded UCI bit sequence on the determined uplink channel in each of subsequent repetition transmissions of the UCI.

Here, the method for the network-side device to determine the uplink channel and the encoded UCI bit sequence is similar to the method on the terminal side, and will not be repeated here.

For example, if the terminal determines the PUCCH as the uplink channel for transmitting the encoded UCI bit sequence, the network-side device needs to receive the encoded UCI bit sequence on the PUCCH; if the terminal determines the PUSCH as the uplink channel for transmitting the encoded UCI bit sequence, the network-side device needs to receive the transmitted encoded UCI bit sequence on the PUSCH.

However, it should be noted here that the transmission resources required by the encoded UCI bit sequence may not match with the transmission resources for transmitting the encoded UCI bit sequence on the determined uplink channel. When the mismatch occurs, the terminal needs to process the encoded UCI bit sequence, specifically:

if the transmission resource required by the encoded UCI bit sequence is larger than the transmission resource for transmitting the UCI on the determined uplink channel, the terminal performs truncation processing on the encoded UCI bit sequence.

For example, the encoded UCI bit sequence is 101011100110, which is 12 bits in total. In the QPSK (Quadrature Phase Shift Keying) modulation mode (2 bits correspond to one QPSK modulation symbol), 6 modulation symbols will be obtained. Assuming that each RE carries a modulation symbol, then 6 REs are required. If the transmission resources on the uplink channel provided to the UCI are only 5 REs, then the resources required by the encoded UCI bit sequence are more than the transmission resources for transmitting the encoded UCI bit sequence on the determined uplink channel. At this time, the terminal removes some bits at the end of the bit sequence 101011100110, that is, the encoded UCI bit sequence becomes 10101110, obtaining 5 modulation symbols that are mapped onto 5 REs for transmission.

The terminal transmits the encoded UCI bit sequence after the truncation processing to the network-side device on the determined uplink channel.

Correspondingly, when receiving the encoded UCI bit sequence on the determined uplink channel, the network-side device can also determine that the resources required by the original encoded UCI bit sequence are more than the actual resources according to the same method described above, so what received on the uplink channel is the encoded UCI bit sequence after the truncation processing. When merging the encoded UCI bit sequence, the network-side device merges the truncated encoded UCI bit sequence that is received currently with the corresponding bits in the encoded UCI bit sequence received in the previous transmission. For example, the encoded UCI bit sequence received in the previous transmission is the original sequence 101011100110, while the truncated encoded UCI bit sequence that is received currently is the sequence 1010111001, so there is only a need to merge the first 10 bits in the original 12 bits with the truncated encoded UCI bit sequence.

Here, the merging is a bit-level merging method, that is, the truncated encoded UCI bit sequence in the subsequent transmission is merged with the bits in the corresponding first part in the encoded UCI bit sequence without truncation, while the latter part that is truncated is not merged.

Of course, the merging process here may also be merging the modulation symbols corresponding to these bits, that is, symbol-level merging. For example, the original encoded UCI bit sequence corresponds to 6 QPSK modulation symbols while the truncated encoded UCI bit sequence corresponds to 5 QPSK modulation symbols, which can be merged with the first five of the 6 modulation symbols; then the bits are obtained by demodulation. No matter which kind of merging method is used as long as it can implement the function of merging the truncated encoded UCI bit sequence into the encoded UCI bit sequence, it falls into the protection scope of the embodiments of the present application.

Correspondingly, if the transmission resources required by the encoded UCI bit sequence are less than the transmission resources for transmitting the UCI on the determined uplink channel, the terminal performs repeat processing on the encoded UCI bit sequence.

For example, the encoded UCI bit sequence is 101011100110, which is 12 bits in total. In the QPSK modulation mode (2 bits correspond to one QPSK modulation symbol), 6 modulation symbols will be obtained. Assuming that each RE carries a modulation symbol, then 6 REs are required. If the transmission resources on the uplink channel provided to the UCI are 8 REs, then the resources required by the encoded UCI bit sequence are less than the transmission resources for transmitting the encoded UCI bit sequence on the determined uplink channel. At this time, the terminal repeatedly cascades some bits of the head of the bit sequence 101011100110 at the end of the sequence, that is, the encoded UCI bit sequence becomes 1010111001101010, obtaining a bit sequence of 16 bits, and then the QPSK modulation is performed to obtain 8 modulation symbols that are mapped onto 8 REs for transmission.

Correspondingly, the terminal transmits the encoded UCI bit sequence after the repeat processing to the network-side device on the determined uplink channel.

Correspondingly, when receiving the encoded UCI bit sequence on the determined uplink channel, the network-side device can also judge that the resources required by the original encoded UCI bit sequence are less than the actual resources according to the same method described above, so what received on the uplink channel is the encoded UCI bit sequence after the repeat processing. When merging the encoded UCI bit sequence, the network-side device merges the encoded UCI bit sequence with repetition that is received currently with the corresponding bits in the encoded UCI bit sequence received in the previous transmission. For example, the encoded UCI bit sequence received in the previous transmission is the original sequence 101011100110, while the repeated encoded UCI bit sequence that is received currently is the sequence 10101110011010, so the first 12 bits in the encoded UCI bit sequence with repetition may be merged with the previously received encoded UCI bit sequence, and then the last 4 bits in the encoded UCI bit sequence with repetition is merged with the first 4 bits in the 12-bit sequence obtained after merging; or the base station may also perform de-duplication encoding on the encoded UCI bit sequence with repetition firstly, that is, the 4-bit repeated content at the end is merged into the 4 bits at the head to restore to a 12-bit sequence that is then merged with the previously received encoded UCI bit sequence.

Figure 4:
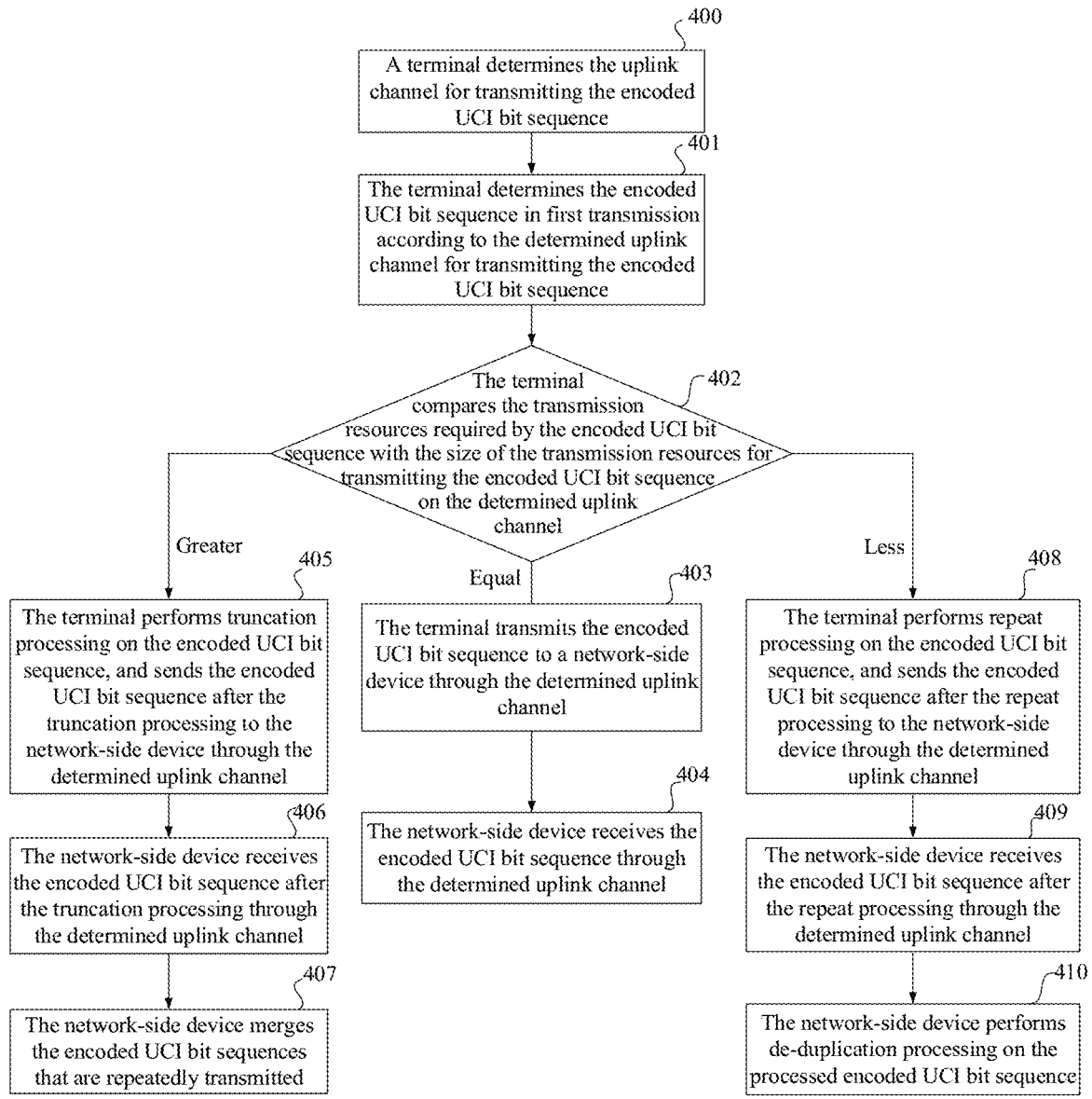
FIG. 4 is a complete flow chart of a method for transmitting uplink control information in an embodiment of the present application.

As shown in FIG. 4, an embodiment of the present application provides a complete flow chart of a method for transmitting uplink control information.

Step 400: a terminal determines the uplink channel for transmitting the encoded UCI bit sequence.

Step 401: the terminal determines the encoded UCI bit sequence in first transmission according to the determined uplink channel for transmitting the encoded UCI bit sequence.

Step 402: the terminal compares the transmission resources required by the encoded UCI bit sequence with the size of the transmission resources for transmitting the encoded UCI bit sequence on the determined uplink channel, and performs step 405 in response to that the transmission resources required by the encoded UCI bit sequence is greater than the size of the transmission resources for transmitting the encoded UCI bit sequence on the determined uplink channel; performs step 408 in response to that the transmission resources required by the encoded UCI bit sequence is less than the size of the transmission resources for transmitting the encoded UCI bit sequence on the determined uplink channel; performs step 403 if in response to that the transmission resources required by the encoded UCI bit sequence is equal than the size of the transmission resources for transmitting the encoded UCI bit sequence on the determined uplink channel.

Step 403: the terminal transmits the encoded UCI bit sequence to a network-side device through the determined uplink channel.

Step 404: the network-side device receives the transmitted encoded UCI bit sequence through the determined uplink channel; and the process ends.

Step 405: the terminal performs truncation processing on the encoded UCI bit sequence, and sends the encoded UCI bit sequence after the truncation processing to the network-side device through the determined uplink channel.

Step 406: the network-side device receives the encoded UCI bit sequence after the truncation processing through the determined uplink channel.

Step 407: the network-side device merges the encoded UCI bit sequences that are repeatedly transmitted; and the process ends.

Step 408: the terminal performs repeat processing on the encoded UCI bit sequence, and sends the encoded UCI bit sequence after the repeat processing to the network-side device through the determined uplink channel.

Step 409: the network-side device receives the encoded UCI bit sequence after the repeat processing through the determined uplink channel.

Step 410: the network-side device performs de-duplication processing on the processed encoded UCI bit sequence, and the process ends.

The method for transmitting uplink control information will be described in detail below in combination with some embodiments.

First Embodiment

Figure 5:
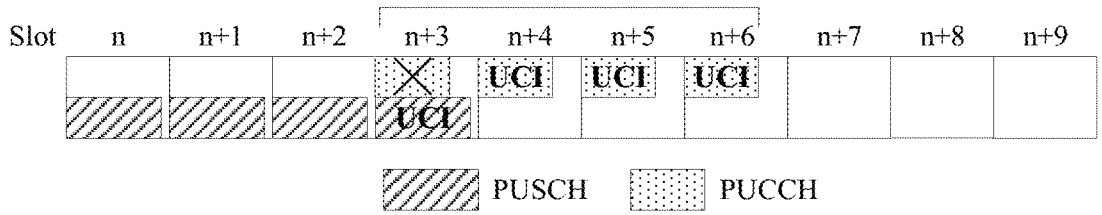
FIG. 5 is a schematic diagram showing the terminal determining a PUSCH as the uplink channel for transmitting the encoded UCI bit sequence in slot n+3 in an embodiment of the present application.
Figure 6:
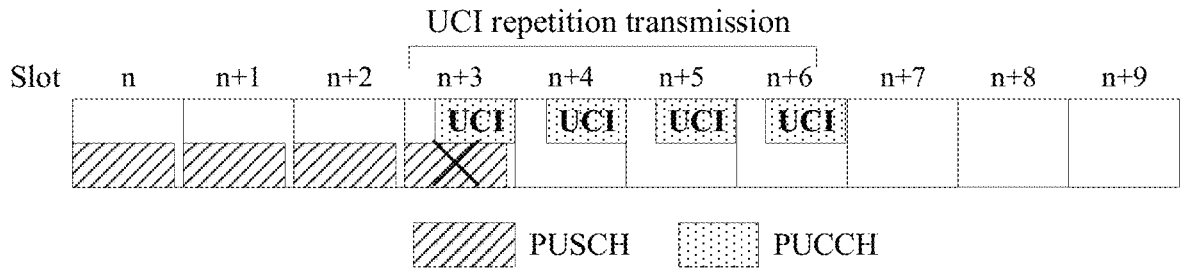
FIG. 6 is a schematic diagram showing the terminal determining a PUCCH as the uplink channel for transmitting the encoded UCI bit sequence in slot n+3 in an embodiment of the present application.

As shown in FIGS. 5-6, it is assumed that the network-side device configures the PUCCH of the terminal to be repeatedly transmitted in 4 slots through the RRC (Radio Resource Control) signaling, for example, the PUCCH starts in slot n+3 and is repeatedly transmitted in the successive slots n+3, n+4, n+5 and n+6; and at the same time, also configures the PUSCH to be repeatedly transmitted in 4 slots, for example, the PUSCH starts in slot n and is repeatedly transmitted in the successive slots n, n+1 n+2 and n+3.

As can be seen from FIGS. 5-6, there is a time-domain overlapping between the PUSCH and the repeatedly transmitted PUCCH in slot n+3. At this time, the terminal needs to determine the uplink channel for transmitting the encoded UCI bit sequence from the PUSCH and PUCCH according to a predetermined rule. Also, the encoded UCI bit sequence may vary according to the different selection results of the uplink channel carrying the UCI in slot n+3, so there is a need to process according to the difference between the encoded UCI bit sequence and the actual resource in the subsequently repeated transmission slots.

A case is illustrated as shown in FIG. 5.

In slot n+3, when the start symbol of the PUCCH is aligned with or ahead of the start symbol of the PUSCH, the terminal determines the PUSCH as the uplink channel for transmitting the encoded UCI bit sequence. At this time, the terminal can place the UCI configured using the PUCCH on the PUSCH for transmission, so that the PUCCH is not transmitted in slot n+3.

Correspondingly, since it is determined that the encoded UCI bit sequence in first transmission among the UCI repetition transmission is on the PUSCH in slot n+3, the terminal needs to determine the resources occupied by the UCI on the PUSCH according to the resource allocation situation of the PUSCH and the rule of the transmission of the UCI on the PUSCH, and perform channel encoding on the original UCI bits according to the resource size to obtain the bit sequences of the encoded UCI, and transmit these bit sequences of the encoded UCI to the network-side device on the corresponding resources on the PUSCH.

Here, when these bit sequences of the encoded UCI are transmitted on the corresponding resources on the PUSCH, they may be scrambled and modulated to form modulation symbols, and mapped onto the corresponding REs for transmission.

Since the network-side device needs to receive the encoded UCI bit sequence on the corresponding resources on the PUSCH, the network-side device also needs to determine that the UCI is transmitted on the PUSCH and determine the encoded UCI bit sequence in first transmission among the UCI repetition transmission in accordance with the terminal-side method. Since the specific method is the same as the terminal-side method, it will not be repeated here.

In slots n+4, n+5 and n+6, since there is only PUCCH, the UCI is transmitted on the PUCCH. The UCI is transmitted in accordance with the encoded bit sequence obtained from the UCI in slot n+3. That is, the UCI is not re-encoded for the current PUCCH resources; since the encoded UCI bit sequence in slot n+3 is obtained by encoding the UCI transmitted on the PUSCH, and the transmission resources of the UCI on the PUCCH and PUSCH are different in size, the encoded UCI bit sequence in slot n+3 may not match with the UCI transmission resources on the PUCCH. Therefore, there is a need to judge whether they match at this time. If they match, the mapping and transmission are performed directly; otherwise the encoded UCI bit sequence is processed. The details are as follows.

If the transmission resource capacity of the PUCCH for carrying the UCI is less than that required by the encoded UCI bit sequence, the encoded UCI bit sequence is truncated. For example, some bits at the end are removed until the UCI carrying capacity of the PUCCH is matched, and the terminal sends the truncated encoded UCI bit sequence on the corresponding resources of the PUSCH.

For example, the encoded UCI bit sequence is 101011100110, which is 12 bits in total. In the QPSK modulation mode (2 bits correspond to one QPSK modulation symbol), 6 modulation symbols will be obtained. Assuming that each RE carries a modulation symbol, then 6 REs are required. If the transmission resources on the uplink channel provided to the UCI are only 5 REs, then the resources required by the encoded UCI bit sequence are more than the transmission resources for transmitting the encoded UCI bit sequence on the PUCCH. At this time, the terminal removes some bits at the end of the bit sequence 101011100110 of the encoded UCI, that is, the encoded UCI bit sequence becomes 10101110, obtaining 5 modulation symbols that are mapped onto 5 REs for transmission.

Correspondingly, when receiving the encoded UCI bit sequence on the PUSCH, the network-side device can also judge that the resources required by the original encoded UCI bit sequence are more than the actual resources according to the same method described above, so what received on the uplink channel is the encoded UCI bit sequence after the truncation processing. When merging the encoded UCI bit sequence, the network-side device merges the truncated encoded UCI bit sequence that is received currently with the corresponding bits in the encoded UCI bit sequence received in the previous transmission. For example, the encoded UCI bit sequence received in the previous transmission is the original sequence 101011100110, while the truncated encoded UCI bit sequence that is received currently is the sequence 1010111001, so there is only a need to merge the first 10 bits in the original 12 bits with the truncated encoded UCI bit sequence.

Here, the merging is a bit-level merging method, and of course, it may also be merging the modulation symbols corresponding to these bits, that is, symbol-level merging. For example, the original encoded UCI bit sequence corresponds to 6 QPSK modulation symbols while the truncated encoded UCI bit sequence corresponds to 5 QPSK modulation symbols, which can be merged with the first five of the 6 modulation symbols; and then the bits are obtained by demodulation.

The so-called bit-level merging is to merge the truncated encoded UCI bit sequence in the subsequent transmission with the bits in the corresponding first part in the encoded UCI bit sequence without truncation, while the latter part that is truncated is not merged.

If the transmission resource capacity of the PUCCH for carrying the UCI is greater than the encoded UCI bit sequence, the encoded UCI bit sequence is cyclically repeated, for example, some bits at the head are repeatedly cascaded at the end until the UCI carrying capacity of the PUCCH is matched, and the terminal sends the cyclically repeated encoded UCI bit sequence on the corresponding resources of the PUSCH.

For example, the encoded UCI bit sequence is 101011100110, which is 12 bits in total. In the QPSK modulation mode (2 bits correspond to one QPSK modulation symbol), 6 modulation symbols will be obtained. Assuming that each RE carries a modulation symbol, then 6 REs are required. If the transmission resources on the uplink channel provided to the UCI are 8 REs, then the resources required by the encoded UCI bit sequence are less than the transmission resources for transmitting the encoded UCI bit sequence on the PUCCH. At this time, the terminal repeatedly cascades some bits of the head of the bit sequence 101011100110 of the encoded UCI at the end thereof, that is, the encoded UCI bit sequence becomes 1010111001101010, obtaining a bit sequence of 16 bits, and then the QPSK modulation is performed to obtain 8 modulation symbols that are mapped onto 8 REs for transmission.

Correspondingly, when receiving the encoded UCI bit sequence on the PUSCH, the network-side device can also judge that the resources required by the original encoded UCI bit sequence are less than the actual resources according to the same method described above, so what received on the uplink channel is the encoded UCI bit sequence after the repeat processing. When merging the encoded UCI bit sequence, the network-side device merges the encoded UCI bit sequence with repetition that is received currently with the corresponding bits in the encoded UCI bit sequence received in the previous transmission. For example, the encoded UCI bit sequence received in the previous transmission is the original sequence 101011100110, while the encoded UCI bit sequence with repetition that is received currently is the sequence 10101110011010, so the first 12 bits in the encoded UCI bit sequence with repetition may be merged with the previously received encoded UCI bit sequence, and then the last 4 bits in the encoded UCI bit sequence with repetition is merged with the first 4 bits in the 12-bit sequence obtained after merging; or the base station may also perform de-duplication encoding on the repeated encoded UCI bit sequence firstly, that is, the 4-bit repeated content at the end is merged into the 4 bits at the head to restore to a 12-bit sequence that is then merged with the previously received encoded UCI bit sequence.

Another case is illustrated as shown in FIG. 6.

In slot n+3, when the start symbol of the PUCCH is behind the start symbol of the PUSCH, the terminal determines the PUCCH as the uplink channel for transmitting the encoded UCI bit sequence. At this time, the PUSCH transmission is discarded and only the PUCCH is transmitted in slot n+3, and it is determined that the first transmission of the UCI is performed on the PUCCH in slot n+3.

Correspondingly, since it is judged that the encoded UCI bit sequence in first transmission is on the PUCCH in slot n+3, the terminal needs to determine the resources occupied by the UCI on the PUCCH according to the resource allocation situation of the PUCCH and the rule of the transmission of the UCI on the PUCCH, and perform channel encoding on the original UCI bits according to the resource size to obtain the bit sequences of the encoded UCI, and needs to transmit these bit sequences of the encoded UCI to the network-side device on the corresponding resources on the PUCCH.

Since the network-side device needs to receive the encoded UCI bit sequence on the PUCCH, the network-side device also needs to determine that the UCI is transmitted on the PUCCH in accordance with the terminal-side method. Since the specific method is the same as the terminal-side method, it will not be repeated here.

In slots n+4, n+5 and n+6, since there is only PUCCH, the UCI is transmitted on the PUCCH. The UCI is transmitted in accordance with the encoded bit sequence obtained from the UCI in slot n+3. That is, the UCI is not re-encoded for the current PUCCH resources; since the encoded UCI bit sequence in slot n+3 is obtained by encoding the UCI transmitted on the PUCCH, and the PUCCH transmission resources in slot n+3 and the subsequent slots are the same, the transmission of the encoded UCI bit sequence in slot n+3 on the PUCCH in the subsequent slots is the same as that in slot n+3. Thus there is no need to process the encoded UCI bit sequence.

Correspondingly, the network-side device receives the original encoded UCI bit sequence on the PUCCH, and merges the received encoded UCI bit sequence currently with the encoded UCI bit sequence in the previous slot. After merging the bit sequences of the encoded UCI in the last slot, the network-side device can make a decoding decision to obtain the final decoding information, obtaining the original UCI transmitted by the terminal.

When receiving the last repeated transmission of UCI and after merging the bit sequences of the encoded UCI in the last slot, the network-side device can make a decoding decision to obtain the final decoding information, obtaining the original UCI transmitted by the terminal.

Second Embodiment

Figure 7:
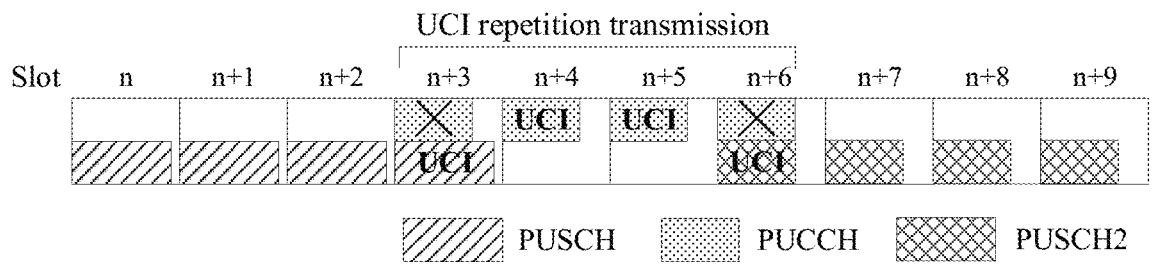
FIG. 7 is a first schematic diagram showing the terminal determining the PUSCH2 as the uplink channel for transmitting the encoded UCI bit sequence in slot n+6 in an embodiment of the present application.
Figure 8:
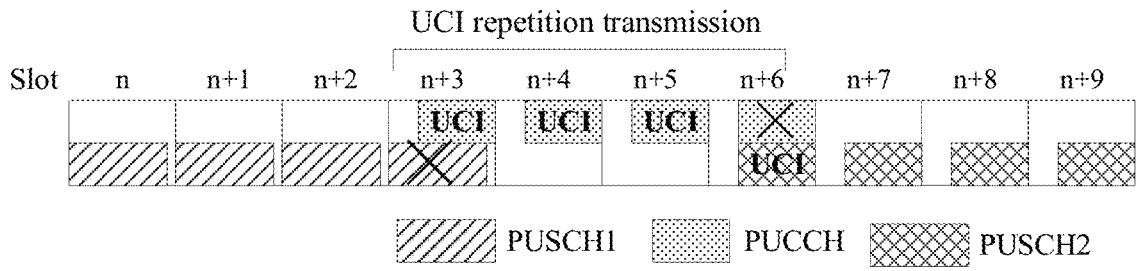
FIG. 8 is a second schematic diagram showing the terminal determining the PUSCH2 as the uplink channel for transmitting the encoded UCI bit sequence in slot n+6 in an embodiment of the present application.

As shown in FIGS. 7-8, it is assumed that the network-side device configures the PUCCH of the terminal to be repeatedly transmitted in 4 slots through the RRC signaling, for example, the PUCCH starts in slot n+3 and is repeatedly transmitted in the successive slots n+3, n+4, n+5 and n+6; and at the same time, also configures the PUSCH to be repeatedly transmitted in 4 slots, for example, the PUSCH1 starts in slot n and is repeatedly transmitted in the successive slots n, n+1 n+2 and n+3, and the PUSCH2 starts in slot n+6 and is repeatedly transmitted in the successive slots n+6, n+7, n+8 and n+9.

1. As can be seen from FIGS. 7-9, there is a time-domain overlapping between the PUSCH and the repeatedly transmitted PUCCH in slot n+3. At this time, the UCI transmission method is similar to the first embodiment, and will not be repeated here.

2. In slots n+4 and n+5, since there is only PUCCH, the UCI is transmitted on the PUCCH. The specific transmission method is similar to the first embodiment, and will not be repeated here.

3. In slot n+6, there is a time-domain overlapping between the PUSCH and the repeatedly transmitted PUCCH. At this time, the terminal needs to determine the uplink channel carrying the encoded UCI bit sequence from the PUSCH and PUCCH according to a predetermined rule.

However, it should be noted here that no matter which channel the terminal determines as the uplink channel carrying the encoded UCI bit sequence, the UCI will not be re-encoded at this time.

(1) As shown in FIGS. 7-8, when the start symbol of the PUCCH is aligned with or ahead of the start symbol of the PUSCH2, the terminal determines the PUSCH2 as the uplink channel carrying the encoded UCI bit sequence. At this time, the terminal can place the UCI configured using the PUCCH on the PUSCH2 for transmission, so that the PUCCH is not transmitted in slot n+6.

When the terminal places the UCI configured using the PUCCH on the PUSCH2 for transmission, the resource may be different from that for transmitting the UCI on the uplink channel carrying the UCI in slot n+3, so there is further a need to judge whether to perform the truncation or repeat processing on the encoded UCI bit sequence obtained in slot n+3.

As shown in FIG. 7, if the encoded UCI bit sequence in slot n+3 is obtained by encoding the UCI transmitted on the PUSCH1, the encoded UCI bit sequence in slot n+3 may not match with the UCI transmission resources on the PUSCH2 because the transmission resources of the UCI on the PUSCH1 and PUSCH2 are different in size.

As shown in FIG. 8, if the encoded UCI bit sequence in slot n+3 is obtained by encoding the UCI transmitted on the PUCCH, the encoded UCI bit sequence in slot n+3 may not match with the UCI transmission resources on the PUCCH either because the transmission resources of the UCI on the PUCCH and PUSCH2 are different in size.

At this time, it is necessary to judge whether the encoded UCI bit sequence matches with the UCI transmission resources on the determined channel. If they match, the mapping and transmission are performed directly; otherwise the following processing is performed.

If the transmission resource capacity of the PUSCH2 carrying the UCI is less than that is required by the encoded UCI bit sequence, the encoded UCI bit sequence is truncated, for example, some bits at the end are removed until the UCI carrying capacity of the PUSCH2 is matched, and the terminal sends the truncated encoded UCI bit sequence on the corresponding resources of the PUSCH2.

For example, the encoded UCI bit sequence is 101011100110, which is 12 bits in total. In the QPSK modulation mode (2 bits correspond to one QPSK modulation symbol), 6 modulation symbols will be obtained. Assuming that each RE carries a modulation symbol, then 6 REs are required. If the transmission resources on the uplink channel provided to the UCI are only 5 REs, then the resources required by the encoded UCI bit sequence are more than the transmission resources for transmitting the encoded UCI bit sequence on the PUSCH2. At this time, the terminal removes some bits at the end of the bit sequence 101011100110 of the encoded UCI (that is, the encoded UCI bit sequence becomes 10101110), obtaining 5 modulation symbols that are mapped onto 5 REs for transmission.

Correspondingly, when receiving the encoded UCI bit sequence on the PUSCH2, the network-side device can also judge that the resources required by the original encoded UCI bit sequence are more than the actual resources according to the same method described above, so what received on the uplink channel is the encoded UCI bit sequence after the truncation processing. When merging the encoded UCI bit sequence, the network-side device merges the truncated encoded UCI bit sequence that is received currently with the corresponding bits in the encoded UCI bit sequence received in the previous transmission. For example, the encoded UCI bit sequence received in the previous transmission is the original sequence 101011100110, while the truncated encoded UCI bit sequence that is received currently is the sequence 1010111001, so there is only a need to merge the first 10 bits in the original 12 bits with the truncated encoded UCI bit sequence.

Here, the merging is a bit-level merging method, and of course, it may also be merging the modulation symbols corresponding to these bits, that is, symbol-level merging. For example, the original encoded UCI bit sequence corresponds to 6 QPSK modulation symbols while the truncated encoded UCI bit sequence corresponds to 5 QPSK modulation symbols, which can be merged with the first five of the 6 modulation symbols; and then the bits are obtained by demodulation.

The so-called bit-level merging is to merge the truncated encoded UCI bit sequence in the subsequent transmission with the bits in the corresponding first part in the encoded UCI bit sequence without truncation, while the latter part that is truncated is not merged.

If the UCI carrying capacity of the PUSCH2 is greater than that required by the encoded UCI bit sequence, the encoded UCI bit sequence is cyclically repeated, for example, some bits at the head are repeatedly cascaded at the end until the UCI carrying capacity of the PUSCH2 is matched, and the terminal sends the cyclically repeated encoded UCI bit sequence on the corresponding resources of the PUSCH2.

For example, the encoded UCI bit sequence is 101011100110, which is 12 bits in total. In the QPSK modulation mode (2 bits correspond to one QPSK modulation symbol), 6 modulation symbols will be obtained. Assuming that each RE carries a modulation symbol, then 6 REs are required. If the transmission resources on the uplink channel provided to the UCI are 8 REs, then the resources required by the encoded UCI bit sequence are less than the transmission resources for transmitting the encoded UCI bit sequence on the PUSCH2. At this time, the terminal repeatedly cascades some bits of the head of the bit sequence 101011100110 of the encoded UCI at the end thereof (that is, the encoded UCI bit sequence becomes 1010111001101010), obtaining a bit sequence of 16 bits, and then the QPSK modulation is performed to obtain 8 modulation symbols that are mapped onto 8 REs for transmission.

Correspondingly, when receiving the encoded UCI bit sequence on the PUSCH2, the network-side device can also judge that the resources required by the original encoded UCI bit sequence are less than the actual resources according to the same method described above, so what received on the uplink channel is the encoded UCI bit sequence after the repeat processing. When merging the encoded UCI bit sequence, the network-side device merges the repeated encoded UCI bit sequence that is received with the corresponding bits in the encoded UCI bit sequence received in the previous transmission. For example, the encoded UCI bit sequence received in the previous transmission is the original sequence 101011100110, while the encoded UCI bit sequence with repetition that is received currently is the sequence 1010111001101010, so the first 12 bits in the repeated encoded UCI bit sequence may be merged with the previously received encoded UCI bit sequence, and then the last 4 bits in the repeated encoded UCI bit sequence is merged with the first 4 bits in the 12-bit sequence obtained after merging; or the base station may also perform de-duplication encoding on the encoded UCI bit sequence with repetition firstly, that is, the 4-bit repeated content at the end is merged into the 4 bits at the head to restore to a 12-bit sequence that is then merged with the previously received encoded UCI bit sequence.

When receiving the last UCI repeated transmission and after merging the bit sequences of the encoded UCI in the last slot, the network-side device can make a decoding decision to obtain the final decoding information, obtaining the original UCI transmitted by the terminal.

When the start symbol of the PUCCH is behind the start symbol of the PUSCH2, the terminal determines the PUCCH as the uplink channel carrying the encoded UCI bit sequence that is transmitted repeatedly. The specific transmission method is the same as that in slots n+4 and n+5, and will not be repeated here.

Third Embodiment

Figure 9:
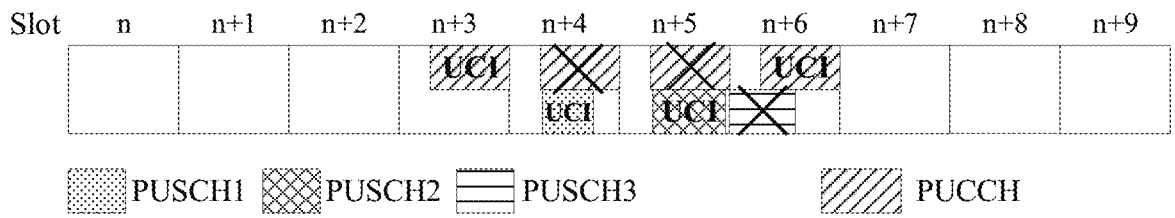
FIG. 9 is a schematic diagram of UCI transmission in three different slots in an embodiment of the present application.

As shown in FIG. 9, it is assumed that the network-side device configures the PUCCH of the terminal to be repeatedly transmitted in 4 slots through the RRC signaling, for example, the PUCCH starts in slot n+3 and is repeatedly transmitted in the successive slots n+3, n+4, n+5 and n+6; and configures the PUSCH not to be repeatedly transmitted, for example, the PUSCH1 is transmitted in slot n+4 and has the start symbol aligned with that of the PUCCH, the PUSCH2 is transmitted in slot n+5 and has the start symbol aligned with that of the PUCCH, and the PUSCH3 is transmitted in slot n+6 and has the start symbol ahead of that of the PUCCH.

Figure 10:
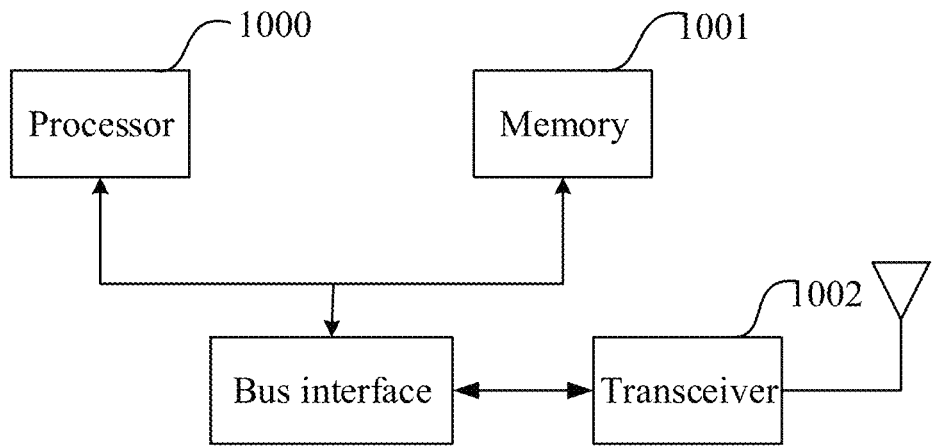
FIG. 10 is a structural schematic diagram of a terminal for transmitting uplink control information in an embodiment of the present application.

As can be seen from FIG. 10, the UCI is only transmitted on the corresponding resources on the PUCCH in slot n+3, so the terminal encodes the UCI according to the corresponding resources carrying the UCI on the PUCCH to obtain the bit sequences of the encoded UCI, and transmits these bit sequences of the encoded UCI on the corresponding resources on the PUCCH.

Correspondingly, since the network-side device needs to receive the encoded UCI bit sequence on the PUCCH, the network-side device also needs to determine the corresponding resource transmission of the UCI on the PUCCH in accordance with the terminal-side method. Since the specific method is the same as the terminal-side method, it will not be repeated here.

1. In slot n+4, the PUSCH1 is transmitted in slot n+4 and has the start symbol aligned with that of the PUCCH, so the terminal determines the PUSCH1 as the uplink channel carrying the encoded UCI bit sequence.

Since the corresponding transmission resources of the UCI on the PUCCH and PUSCH1 are different in size, the encoded UCI bit sequence in slot n+3 may not match with the UCI transmission resources on the PUSCH1. Therefore, there is a need to judge whether they match at this time. If they match, the mapping and transmission are performed directly; otherwise the UCI carrying capacity of the PUSCH1 and the UCI coded bits are processed.

If the transmission resource capacity of the PUSCH1 carrying the UCI is less than that required by the encoded UCI bit sequence, the encoded UCI bit sequence is truncated, for example, some bits at the end are removed until the UCI carrying capacity of the PUSCH1 is matched, and the terminal sends the truncated encoded UCI bit sequence on the PUSCH1.

For example, the encoded UCI bit sequence is 101011100110, which is 12 bits in total. In the QPSK modulation mode (2 bits correspond to one QPSK modulation symbol), 6 modulation symbols will be obtained. Assuming that each RE carries a modulation symbol, then 6 REs are required. If the transmission resources on the uplink channel provided to the UCI are only 5 REs, then the resources required by the encoded UCI bit sequence are more than the transmission resources for transmitting the encoded UCI bit sequence on the PUSCH1. At this time, the terminal removes some bits at the end of the bit sequence 101011100110 of the encoded UCI, that is, the encoded UCI bit sequence becomes 10101110, obtaining 5 modulation symbols that are mapped onto 5 REs for transmission.

Correspondingly, when receiving the encoded UCI bit sequence on the PUSCH1, the network-side device can also judge that the resources required by the original encoded UCI bit sequence are more than the actual resources according to the same method described above, so what received on the uplink channel is the encoded UCI bit sequence after the truncation processing. When merging the encoded UCI bit sequence, the network-side device merges the truncated encoded UCI bit sequence that is received with the corresponding bits in the encoded UCI bit sequence received in the previous transmission. For example, the encoded UCI bit sequence received in the previous transmission is the original sequence 101011100110, while the truncated encoded UCI bit sequence that is received currently is the sequence 1010111001, so there is only a need to merge the first 10 bits in the original 12 bits with the truncated encoded UCI bit sequence.

Here, the merging is a bit-level merging method, and of course, it may also be merging the modulation symbols corresponding to these bits, that is, symbol-level merging. For example, the original encoded UCI bit sequence corresponds to 6 QPSK modulation symbols while the truncated encoded UCI bit sequence corresponds to 5 QPSK modulation symbols, which can be merged with the first five of the 6 modulation symbols; and then the bits are obtained by demodulation.

The so-called corresponding bit merging is to merge the truncated encoded UCI bit sequence in the subsequent transmission with the bits in the corresponding first part in the encoded UCI bit sequence without truncation, while the latter part that is truncated is not merged.

If the transmission resource capacity of the PUSCH1 carrying the UCI is greater than that required by the encoded UCI bit sequence, the encoded UCI bit sequence is cyclically repeated, for example, some bits at the head are repeatedly cascaded at the end until the UCI carrying capacity of the PUSCH1 is matched, and the terminal sends the cyclically repeated encoded UCI bit sequence on the corresponding resources of the PUSCH1.

For example, the encoded UCI bit sequence is 101011100110, which is 12 bits in total. In the QPSK modulation mode (2 bits correspond to one QPSK modulation symbol), 6 modulation symbols will be obtained. Assuming that each RE carries a modulation symbol, then 6 REs are required. If the transmission resources on the uplink channel provided to the UCI are 8 REs, then the resources required by the encoded UCI bit sequence are less than the transmission resources for transmitting the encoded UCI bit sequence on the PUSCH1. At this time, the terminal repeatedly cascades some bits of the head of the bit sequence 101011100110 of the encoded UCI at the end thereof, that is, the encoded UCI bit sequence becomes 1010111001101010, obtaining a bit sequence of 16 bits, and then the QPSK modulation is performed to obtain 8 modulation symbols that are mapped onto 8 REs for transmission.

Correspondingly, when receiving the encoded UCI bit sequence on the PUSCH1, the network-side device can also judge that the resources required by the original encoded UCI bit sequence are less than the actual resources according to the same method described above, so what received on the uplink channel is the encoded UCI bit sequence after the repeat processing. When merging the encoded UCI bit sequence, the network-side device merges the encoded UCI bit sequence with repeation that is received currently with the corresponding bits in the encoded UCI bit sequence received in the previous transmission. For example, the encoded UCI bit sequence received in the previous transmission is the original sequence 101011100110, while the encoded UCI bit sequence with repetition that is received currently is the sequence 10101110011010, so the first 12 bits in the encoded UCI bit sequence with repetition may be merged with the previously received encoded UCI bit sequence, and then the last 4 bits in the encoded UCI bit sequence with repetition is merged with the first 4 bits in the 12-bit sequence obtained after merging; or the base station may also perform de-duplication encoding on the repeated encoded UCI bit sequence firstly, that is, the 4-bit repeated content at the end is merged into the 4 bits at the head to restore to a 12-bit sequence that is then merged with the previously received encoded UCI bit sequence.

2. In slot n+5, the PUSCH2 is transmitted in slot n+5 and has the start symbol aligned with that of the PUCCH, so the terminal determines the PUSCH2 as the uplink channel carrying the encoded UCI bit sequence.

Since the transmission resources of the UCI on the PUCCH and PUSCH2 are different in size, the encoded UCI bit sequence in slot n+3 may not match with the UCI transmission resources on the PUSCH2. Therefore, there is a need to judge whether they match at this time. If they match, the mapping and transmission are performed directly; otherwise the UCI carrying capacity of the PUSCH2 and the UCI coded bits are processed, where the specific processing method is similar to that of the PUSCH1 and will not be repeated here.

3. In slot n+6, the PUSCH3 is transmitted in slot n+6 and has the start symbol ahead of that of the PUCCH, so the terminal determines the PUCCH as the uplink channel carrying the encoded UCI bit sequence that is transmitted repeatedly.

Since the encoded UCI bit sequence is encoded according to the transmission of the UCI on the PUCCH in slot n+3, and the PUCCH resources in multiple slots are the same in size, the terminal can directly transmit the encoded UCI bit sequence in slot n+3 to the network-side device on the PUCCH in slot n+6.

Correspondingly, the network-side device does not need to perform any processing on the encoded UCI bit sequence and may receive it directly. After merging the bit sequences of the encoded UCI in the last slot, the network-side device can make a decoding decision to obtain the final decoding information, obtaining the original UCI transmitted by the terminal.

As shown in FIG. 10, an embodiment of the present application provides an apparatus for transmitting uplink control information. The apparatus may be a terminal that includes a processor 1000, a memory 1001 and a transceiver 1002.

The processor 1000 is responsible for managing the bus architecture and general processing, and the memory 1001 may store the data used by the processor 1000 when performing the operations. The transceiver 1002 is configured to receive and send the data under the control of the processor 1000.

The bus architecture may include any numbers of interconnected buses and bridges, and specifically link various circuits of one or more processors represented by the processor 1000 and the memory represented by the memory 1001. The bus architecture may further link various other circuits such as peripheral device, voltage regulator and power management circuit, which are all well known in the art and thus will not be further described again herein. The bus interface provides an interface. The processor 1000 is responsible for managing the bus architecture and general processing, and the memory 1001 may store the data used by the processor 1000 when performing the operations.

The procedure disclosed by the embodiment of the present application may be applied in the processor 1000 or implemented by the processor 1000. In the implementation process, each step of the signal processing flow may be completed by the integrated logic circuit of hardware in the processor 1000 or the instruction in the form of software. The processor 1000 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 1001, and the processor 1000 reads the information in the memory 1001 and completes the steps of the signal processing flow in combination with its hardware.

Here, the processor 1000 is configured to read a program in the memory 1001 and perform: determining an encoded UCI bit sequence in a first transmission of UCI repetition transmission, the UCI being configured with repetition transmission using a PUCCH, and transmitting the encoded UCI bit sequence on a determined uplink channel in each of subsequent repetition transmissions of the UCI.

In one embodiment, the encoded UCI bit sequence is transmitted by the transceiver 1002 on the determined uplink channel in each of subsequent repetition transmissions of the UCI.

In one embodiment, the processor 1000 is further configured to perform:

in a case that there is a time-domain overlapping between a PUSCH, and a PUCCH for carrying the UCI during the first transmission of the UCI repetition transmission, and it is determined that the UCI is transmitted on the PUSCH, determining the encoded UCI bit sequence in the first transmission based on a transmission resource for transmitting the UCI on the PUSCH; or in a case that there is a time-domain overlapping between a PUSCH and a PUCCH for carrying the UCI during the first transmission of the UCI repetition transmission, and it is determined that the UCI is transmitted on the PUCCH, determining the encoded UCI bit sequence in the first transmission based on a transmission resource for transmitting the UCI on the PUCCH; or in a case that no PUSCH exits during the first transmission of the UCI repetition transmission, determining that the UCI is transmitted on a PUCCH for the UCI repetition transmission, and determining the encoded UCI bit sequence in the first transmission based on a transmission resource for transmitting the UCI on the PUCCH.

In one embodiment, the processor 1000 is configured to perform:

if a transmission resource required by the encoded UCI bit sequence is larger than a transmission resource for transmitting the UCI on the determined uplink channel, performing truncation processing on the encoded UCI bit sequence; or if the transmission resource required by the encoded UCI bit sequence is smaller than the transmission resource for transmitting the UCI on the determined uplink channel, performing repeat processing on the encoded UCI bit sequence.

In one embodiment, the processor 1000 is configured to perform:

if no PUSCH exits during a repetition transmission of the UCI, determining a PUCCH for the UCI repetition transmission as the uplink channel for transmitting the encoded UCI bit sequence; or if there is a time-domain overlapping between a PUSCH and a PUCCH for the UCI repetition transmission during a repetition transmission of the UCI, and a start symbol of the PUCCH is aligned with or ahead of a start symbol of the PUSCH, determining the PUSCH as the uplink channel for transmitting the encoded UCI bit sequence; or if there is a time-domain overlapping between a PUSCH and a PUCCH for the UCI repetition transmission during a repetition transmission of the UCI, and a start symbol of the PUCCH is behind a start symbol of the PUSCH, determining the PUCCH as the uplink channel for transmitting the encoded UCI bit sequence.

Figure 11:
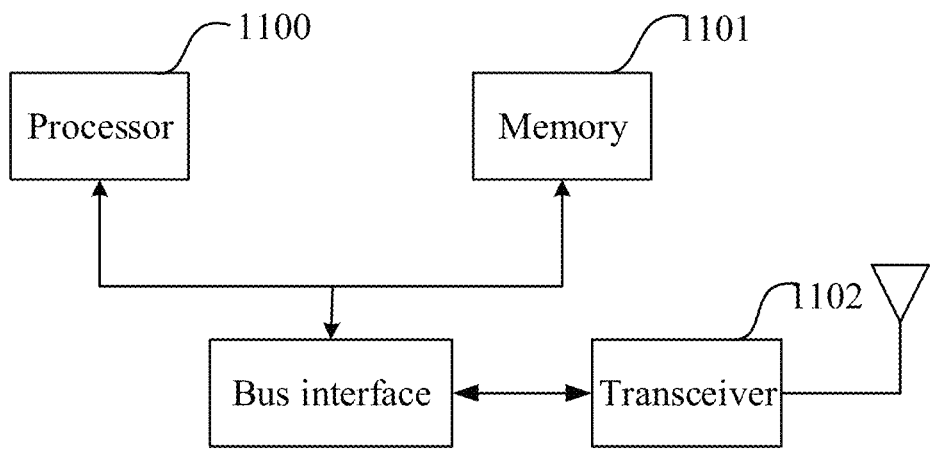
FIG. 11 is a structural schematic diagram of a network-side device for transmitting uplink control information in an embodiment of the present application.

As shown in FIG. 11, an embodiment of the present application provides an apparatus for transmitting uplink control information. The apparatus may be a network-side device that includes a processor 1100, a memory 1101 and a transceiver 1102.

The processor 1100 is responsible for managing the bus architecture and general processing, and the memory 1101 may store the data used by the processor 1100 when performing the operations. The transceiver 1102 is configured to receive and send the data under the control of the processor 1100.

The bus architecture may include any numbers of interconnected buses and bridges, and specifically link various circuits of one or more processors represented by the processor 1100 and the memory represented by the memory 1101. The bus architecture may further link various other circuits such as peripheral device, voltage regulator and power management circuit, which are all well known in the art and thus will not be further described again herein. The bus interface provides an interface. The processor 1100 is responsible for managing the bus architecture and general processing, and the memory 1101 may store the data used by the processor 1100 when performing the operations.

The procedure disclosed by the embodiment of the present application may be applied in the processor 1100 or implemented by the processor 1100. In the implementation process, each step of the signal processing flow may be completed by the integrated logic circuit of hardware in the processor 1100 or the instruction in the form of software. The processor 1100 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 1101, and the processor 1100 reads the information in the memory 1101 and completes the steps of the signal processing flow in combination with its hardware.

Here, the processor 1100 is configured to read a program in the memory 1001 and perform: determining an encoded UCI bit sequence in a first transmission of UCI repetition transmission, where the UCI is configured with repetition transmission using a PUCCH; and receiving the encoded UCI bit sequence on a determined uplink channel in each of subsequent repetition transmissions of the UCI.

In one embodiment, the encoded UCI bit sequence is received by the transceiver 1102 on the determined uplink channel in each of subsequent repetition transmissions of the UCI.

In one embodiment, the processor 1100 is further configured to perform:

in a case that there is a time-domain overlapping between a Physical Uplink Shared Channel, PUSCH, and a PUCCH for carrying the UCI during the first transmission of the UCI repetition transmission, and it is determined that the UCI is transmitted on the PUSCH, determining that the encoded UCI bit sequence in the first transmission is determined based on a transmission resource for transmitting the UCI on the PUSCH; or in a case that there is a time-domain overlapping between a PUSCH and a PUCCH for carrying the UCI during the first transmission of the UCI repetition transmission, and it is determined that the UCI is transmitted on the PUCCH, determining that the encoded UCI bit sequence in the first transmission is determined based on a transmission resource for transmitting the UCI on the PUCCH; or in a case that no PUSCH exits during the first transmission of the UCI repetition transmission, determining that the UCI is transmitted on a PUCCH for the UCI repetition transmission, and determining that the encoded UCI bit sequence in the first transmission is determined based on a transmission resource for transmitting the UCI on the PUCCH.

In one embodiment, the processor 1100 is configured to perform:

if a transmission resource required by the encoded UCI bit sequence is larger than a transmission resource for transmitting the UCI on the determined uplink channel, performing merge processing on the encoded UCI bit sequence; or if a transmission resource required by the encoded UCI bit sequence is smaller than a transmission resource for transmitting the UCI on the determined uplink channel, performing deduplication processing on the encoded UCI bit sequence.

In one embodiment, the processor 1100 is configured to perform:

if no PUSCH exits during a repetition transmission of the UCI, determining a PUCCH for the UCI repetition transmission as the uplink channel for receiving the encoded UCI bit sequence; or if there is a time-domain overlapping between a PUSCH and a PUCCH for the UCI repetition transmission during a repetition transmission of the UCI, and a start symbol of the PUCCH is aligned with or ahead of a start symbol of the PUSCH, determining the PUSCH as the uplink channel for receiving the encoded UCI bit sequence; or if there is a time-domain overlapping between a PUSCH and a PUCCH for the UCI repetition transmission during a repetition transmission of the UCI, and a start symbol of the PUCCH is behind a start symbol of the PUSCH, determining the PUCCH as the uplink channel for receiving the encoded UCI bit sequence.

Figure 12:
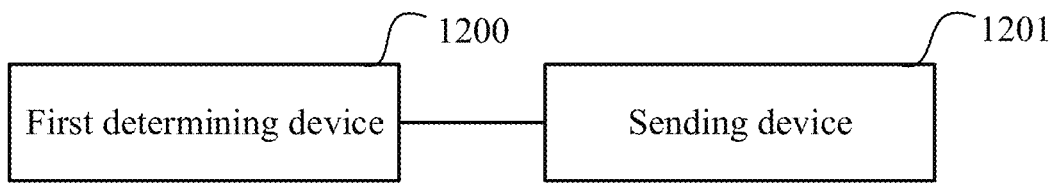
FIG. 12 is a structural schematic diagram of another terminal for transmitting uplink control information in an embodiment of the present application.

As shown in FIG. 12, an embodiment of the present application provides an apparatus for transmitting uplink control information. The apparatus may be a terminal that includes:

a first determining device 1200 configured to determine an encoded UCI bit sequence in a first transmission of UCI repetition transmission, and the UCI is configured with repetition transmission using a PUCCH;

a sending device 1201 configured to transmit the encoded UCI bit sequence on a determined uplink channel in each of subsequent repetition transmissions of the UCI.

In one embodiment, the first determining device 1200 is further configured to:

in a case that there is a time-domain overlapping between a PUSCH, and a PUCCH for carrying the UCI during the first transmission of the UCI repetition transmission, and it is determined that the UCI is transmitted on the PUSCH, determine the encoded UCI bit sequence in the first transmission based on a transmission resource for transmitting the UCI on the PUSCH; or in a case that there is a time-domain overlapping between a PUSCH and a PUCCH for carrying the UCI during the first transmission of the UCI repetition transmission, and it is determined that the UCI is transmitted on the PUCCH, determine the encoded UCI bit sequence in the first transmission based on a transmission resource for transmitting the UCI on the PUCCH; or in a case that no PUSCH exits during the first transmission of the UCI repetition transmission, determine that the UCI is transmitted on a PUCCH for the UCI repetition transmission, and determine the encoded UCI bit sequence in the first transmission based on a transmission resource for transmitting the UCI on the PUCCH.

In one embodiment, the first determining device 1200 is configured to:

if a transmission resource required by the encoded UCI bit sequence is larger than a transmission resource for transmitting the UCI on the determined uplink channel, perform truncation processing on the encoded UCI bit sequence; or if the transmission resource required by the encoded UCI bit sequence is smaller than the transmission resource for transmitting the UCI on the determined uplink channel, perform repeat processing on the encoded UCI bit sequence.

In one embodiment, the sending device 1201 is configured to:

if no PUSCH exits during a repetition transmission of the UCI, determine a PUCCH for the UCI repetition transmission as the uplink channel for transmitting the encoded UCI bit sequence; or if there is a time-domain overlapping between a PUSCH and a PUCCH for the UCI repetition transmission during a repetition transmission of the UCI, and a start symbol of the PUCCH is aligned with or ahead of a start symbol of the PUSCH, determine the PUSCH as the uplink channel for transmitting the encoded UCI bit sequence; or if there is a time-domain overlapping between a PUSCH and a PUCCH for the UCI repetition transmission during a repetition transmission of the UCI, and a start symbol of the PUCCH is behind a start symbol of the PUSCH, determine the PUCCH as the uplink channel for transmitting the encoded UCI bit sequence.

Figure 13:
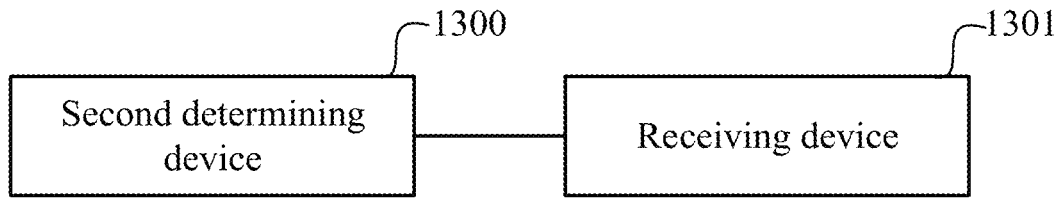
FIG. 13 is a structural schematic diagram of another network-side device for transmitting uplink control information in an embodiment of the present application.

As shown in FIG. 13, an embodiment of the present application provides an apparatus for transmitting uplink control information. The apparatus may be a network-side device that includes:

a second determining device 1300 configured to determine an encoded UCI bit sequence in a first transmission of UCI repetition transmission, where the UCI is configured with repetition transmission using a PUCCH;

a receiving device 1301 configured to receive the encoded UCI bit sequence on a determined uplink channel in each of subsequent repetition transmissions of the UCI.

In one embodiment, the second determining device 1300 is configured to:

in a case that there is a time-domain overlapping between a Physical Uplink Shared Channel, PUSCH, and a PUCCH for carrying the UCI during the first transmission of the UCI repetition transmission, and it is determined that the UCI is transmitted on the PUSCH, determine that the encoded UCI bit sequence in the first transmission is determined based on a transmission resource for transmitting the UCI on the PUSCH; or in a case that there is a time-domain overlapping between a PUSCH and a PUCCH for carrying the UCI during the first transmission of the UCI repetition transmission, and it is determined that the UCI is transmitted on the PUCCH, determine that the encoded UCI bit sequence in the first transmission is determined based on a transmission resource for transmitting the UCI on the PUCCH; or in a case that no PUSCH exits during the first transmission of the UCI repetition transmission, determine that the UCI is transmitted on a PUCCH for the UCI repetition transmission, and determine that the encoded UCI bit sequence in the first transmission is determined based on a transmission resource for transmitting the UCI on the PUCCH.

In one embodiment, the second determining device 1300 is configured to:

if a transmission resource required by the encoded UCI bit sequence is larger than a transmission resource for transmitting the UCI on the determined uplink channel, perform merge processing on the encoded UCI bit sequence; or if a transmission resource required by the encoded UCI bit sequence is smaller than a transmission resource for transmitting the UCI on the determined uplink channel, perform deduplication processing on the encoded UCI bit sequence.

In one embodiment, the receiving device 1301 is configured to:

if no PUSCH exits during a repetition transmission of the UCI, determine a PUCCH for the UCI repetition transmission as the uplink channel for receiving the encoded UCI bit sequence; or if there is a time-domain overlapping between a PUSCH and a PUCCH for the UCI repetition transmission during a repetition transmission of the UCI, and a start symbol of the PUCCH is aligned with or ahead of a start symbol of the PUSCH, determine the PUSCH as the uplink channel for receiving the encoded UCI bit sequence; or if there is a time-domain overlapping between a PUSCH and a PUCCH for the UCI repetition transmission during a repetition transmission of the UCI, and a start symbol of the PUCCH is behind a start symbol of the PUSCH, determine the PUCCH as the uplink channel for receiving the encoded UCI bit sequence.

The methods provided by the embodiments of the present application may be applied to a terminal, and may also be applied to a network-side device.

Here, the terminal may also referred to as User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal may also be a portable, pocket, handheld, computer built-in or vehicle-carried mobile device.

The network-side device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station may be the Base Transceiver Station (BTS) in the GSM or CDMA, or may be the NodeB in the WCDMA, or may be the evolutional Node B (NodeB or eNB or e-NodeB) in the LTE, which is not limited in the embodiments of the disclosure.

An embodiment of the present application further provides a readable storage medium for uplink control information transmission, applied to a terminal. The readable storage medium includes program codes. When the program codes run on a computing device, the program codes are configured to cause the computing device to perform the steps of the terminal-side method.

An embodiment of the present application further provides a readable storage medium for uplink control information transmission, applied to a network-side device. The readable storage medium includes program codes. When the program codes run on a computing device, the program codes are configured to cause the computing device to perform the steps of the method of the network-side device.

In one embodiment, the readable storage medium may be a computer storage medium, and the computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

Based upon the same inventive concept, an embodiment of the present application further provides a method of the terminal for transmitting the uplink control information. Since the device corresponding to this method is the terminal in the system for transmitting the uplink control information in the embodiments of the present application, and the principle solving the problem of this method is similar to that of the device, the implementations of this method may refer to the implementations of the system, and the repeated description thereof will be omitted here.

Figure 14:
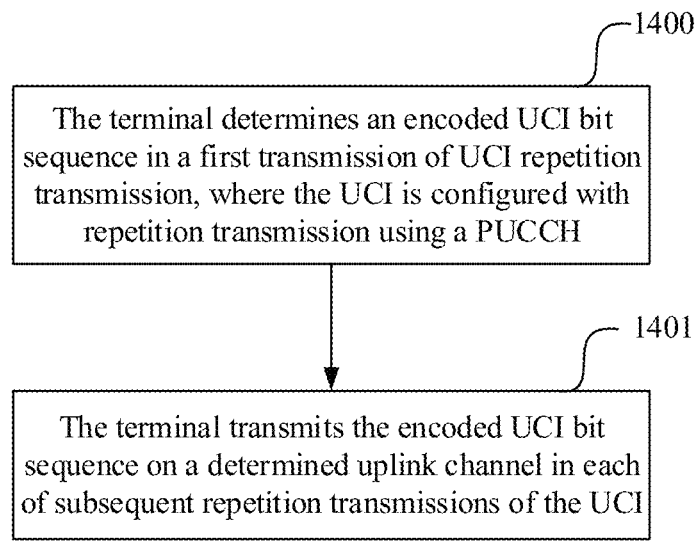
FIG. 14 is a flow chart of a method for transmitting uplink control information at a terminal side in an embodiment of the present application.

As shown in FIG. 14, an embodiment of the present application provides a flow chart of a method for transmitting uplink control information for a terminal.

Step 1400: the terminal determines an encoded UCI bit sequence in a first transmission of UCI repetition transmission, where the UCI is configured with repetition transmission using a PUCCH.

Step 1401: the terminal transmits the encoded UCI bit sequence on a determined uplink channel in each of subsequent repetition transmissions of the UCI.

In one embodiment, the method further includes:

in a case that there is a time-domain overlapping between a PUSCH and a PUCCH for carrying the UCI during the first transmission of the UCI repetition transmission, and it is determined that the UCI is transmitted on the PUSCH, determining the encoded UCI bit sequence in the first transmission based on a transmission resource for transmitting the UCI on the PUSCH; or in a case that there is a time-domain overlapping between a PUSCH and a PUCCH for carrying the UCI during the first transmission of the UCI repetition transmission, and it is determined that the UCI is transmitted on the PUCCH, determining the encoded UCI bit sequence in the first transmission based on a transmission resource for transmitting the UCI on the PUCCH; or in a case that no PUSCH exits during the first transmission of the UCI repetition transmission, determining that the UCI is transmitted on a PUCCH for the UCI repetition transmission, and determining the encoded UCI bit sequence in the first transmission based on a transmission resource for transmitting the UCI on the PUCCH.

In one embodiment, the terminal transmits the encoded UCI bit sequence on the determined uplink channel in each of subsequent repetition transmissions of the UCI, including:

if a transmission resource required by the encoded UCI bit sequence is larger than a transmission resource for transmitting the UCI on the determined uplink channel, performing, by the terminal, truncation processing on the encoded UCI bit sequence; or if the transmission resource required by the encoded UCI bit sequence is smaller than the transmission resource for transmitting the UCI on the determined uplink channel, performing, by the terminal, repeat processing on the encoded UCI bit sequence.

In one embodiment, in each of subsequent repetition transmissions of the UCI, the terminal determines the uplink channel for transmitting the encoded UCI bit sequence by:

if no PUSCH exits during a repetition transmission of the UCI, determining, by the terminal, a PUCCH for the UCI repetition transmission as the uplink channel for transmitting the encoded UCI bit sequence; or if there is a time-domain overlapping between a PUSCH and a PUCCH for the UCI repetition transmission during a repetition transmission of the UCI, and a start symbol of the PUCCH is aligned with or ahead of a start symbol of the PUSCH, determining, by the terminal, the PUSCH as the uplink channel for transmitting the encoded UCI bit sequence; or if there is a time-domain overlapping between a PUSCH and a PUCCH for the UCI repetition transmission during a repetition transmission of the UCI, and a start symbol of the PUCCH is behind a start symbol of the PUSCH, determining, by the terminal, the PUCCH as the uplink channel for transmitting the encoded UCI bit sequence.

Figure 15:
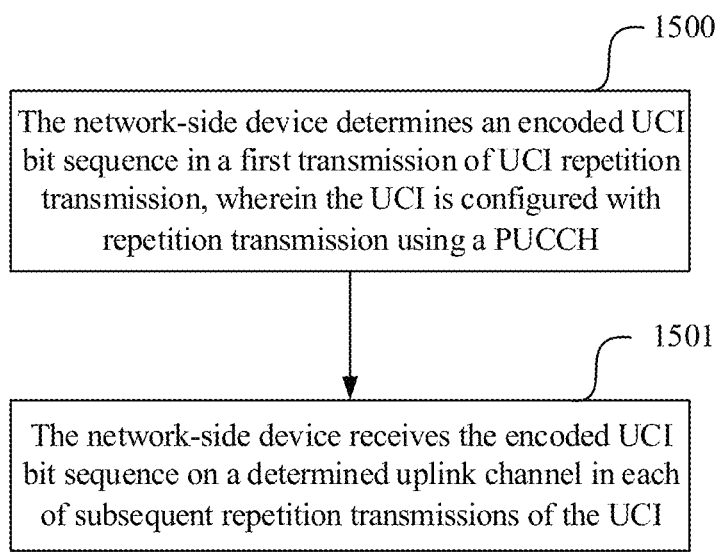
FIG. 15 is a flow chart of a method for transmitting uplink control information at a network-side device in an embodiment of the present application.

As shown in FIG. 15, an embodiment of the present application provides a flow chart of a method for transmitting uplink control information for a network-side device.

Step 1500: the network-side device determines an encoded UCI bit sequence in a first transmission of UCI repetition transmission, and the UCI is configured with repetition transmission using a PUCCH.

Step 1501: the network-side device receives the encoded UCI bit sequence on a determined uplink channel in each of subsequent repetition transmissions of the UCI.

In one embodiment, the method further includes:

in a case that there is a time-domain overlapping between a Physical Uplink Shared Channel, PUSCH, and a PUCCH for carrying the UCI during the first transmission of the UCI repetition transmission, and it is determined that the UCI is transmitted on the PUSCH, determining that the encoded UCI bit sequence in the first transmission is determined based on a transmission resource for transmitting the UCI on the PUSCH; or in a case that there is a time-domain overlapping between a PUSCH and a PUCCH for carrying the UCI during the first transmission of the UCI repetition transmission, and it is determined that the UCI is transmitted on the PUCCH, determining that the encoded UCI bit sequence in the first transmission is determined based on a transmission resource for transmitting the UCI on the PUCCH; or in a case that no PUSCH exits during the first transmission of the UCI repetition transmission, determining that the UCI is transmitted on a PUCCH for the UCI repetition transmission, and determining that the encoded UCI bit sequence in the first transmission is determined based on a transmission resource for transmitting the UCI on the PUCCH.

In one embodiment, receiving the encoded UCI bit sequence on the determined uplink channel in each of subsequent repetition transmissions of the UCI, includes:

if a transmission resource required by the encoded UCI bit sequence is larger than a transmission resource for transmitting the UCI on the determined uplink channel, performing, by the network-side device, merge processing on the encoded UCI bit sequence; or if a transmission resource required by the encoded UCI bit sequence is smaller than a transmission resource for transmitting the UCI on the determined uplink channel, performing, by the network-side device, deduplication processing on the encoded UCI bit sequence.

In one embodiment, in each of subsequent repetition transmissions of the UCI, the network-side device determines the uplink channel for receiving the encoded UCI bit sequence by:

if no PUSCH exits during a repetition transmission of the UCI, determining, by the network-side device, a PUCCH for the UCI repetition transmission as the uplink channel for receiving the encoded UCI bit sequence; or if there is a time-domain overlapping between a PUSCH and a PUCCH for the UCI repetition transmission during a repetition transmission of the UCI, and a start symbol of the PUCCH is aligned with or ahead of a start symbol of the PUSCH, determining, by the network-side device, the PUSCH as the uplink channel for receiving the encoded UCI bit sequence; or if there is a time-domain overlapping between a PUSCH and a PUCCH for the UCI repetition transmission during a repetition transmission of the UCI, and a start symbol of the PUCCH is behind a start symbol of the PUSCH, determining, by the network-side device, the PUCCH as the uplink channel for receiving the encoded UCI bit sequence.

Embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for transmitting uplink control information, comprising:
   determining, by a terminal, an encoded Uplink Control Information, UCI, bit sequence in a first transmission of UCI repetition transmission, wherein the UCI is configured with repetition transmission using a Physical Uplink Control Channel, PUCCH occupying multiple slots, and the UCI is repeated in each of the multiple slots; wherein the encoded UCI bit sequence is determined based on a transmission resource for transmitting the UCI on an uplink channel used in the first transmission;
   transmitting, by the terminal, the encoded UCI bit sequence on a determined uplink channel in each of subsequent repetition transmissions of the UCI;
   wherein the transmitting, by the terminal, the encoded UCI bit sequence on a determined uplink channel in each of subsequent repetition transmissions of the UCI, comprises:
   if a transmission resource required by the encoded UCI bit sequence is larger than a transmission resource for transmitting the UCI on the determined uplink channel in each of the subsequent repetition transmissions of the UCI, performing, by the terminal, truncation processing on the encoded UCI bit sequence; or
   if the transmission resource required by the encoded UCI bit sequence is smaller than the transmission resource for transmitting the UCI on the determined uplink channel in each of the subsequent repetition transmissions of the UCI, performing, by the terminal, repeat processing on the encoded UCI bit sequence.

2. The method of claim 1, further comprising:
   in a case that there is a time-domain overlapping between a Physical Uplink Shared Channel, PUSCH, and a PUCCH for carrying the UCI during the first transmission of the UCI repetition transmission, and it is determined that the UCI is transmitted on the PUSCH, determining the encoded UCI bit sequence in the first transmission based on a transmission resource for transmitting the UCI on the PUSCH; or
   in a case that there is a time-domain overlapping between a PUSCH and a PUCCH for carrying the UCI during the first transmission of the UCI repetition transmission, and it is determined that the UCI is transmitted on the PUCCH, determining the encoded UCI bit sequence in the first transmission based on a transmission resource for transmitting the UCI on the PUCCH; or
   in a case that no PUSCH exits during the first transmission of the UCI repetition transmission, determining that the UCI is transmitted on a PUCCH for the UCI repetition transmission, and determining the encoded UCI bit sequence in the first transmission based on a transmission resource for transmitting the UCI on the PUCCH.

3. The method of claim 1, wherein in each of subsequent repetition transmissions of the UCI, the terminal determines the uplink channel for transmitting the encoded UCI bit sequence by:
   if no PUSCH exits during a repetition transmission of the UCI, determining, by the terminal, a PUCCH for the UCI repetition transmission as the uplink channel for transmitting the encoded UCI bit sequence; or
   if there is a time-domain overlapping between a PUSCH and a PUCCH for the UCI repetition transmission during a repetition transmission of the UCI, and a start symbol of the PUCCH is aligned with or ahead of a start symbol of the PUSCH, determining, by the terminal, the PUSCH as the uplink channel for transmitting the encoded UCI bit sequence; or
   if there is a time-domain overlapping between a PUSCH and a PUCCH for the UCI repetition transmission during a repetition transmission of the UCI, and a start symbol of the PUCCH is behind a start symbol of the PUSCH, determining, by the terminal, the PUCCH as the uplink channel for transmitting the encoded UCI bit sequence.

4. A method for transmitting uplink control information, comprising:
   determining, by a network-side device, an encoded Uplink Control Information, UCI, bit sequence in a first transmission of UCI repetition transmission, wherein the UCI is configured with repetition transmission using a Physical Uplink Control Channel, PUCCH occupying multiple slots, and the UCI is repeated in each of the multiple slots; wherein the encoded UCI bit sequence is determined based on a transmission resource for transmitting the UCI on an uplink channel used in the first transmission;
   receiving, by the network-side device, the encoded UCI bit sequence on a determined uplink channel in each of subsequent repetition transmissions of the UCI;
   wherein the receiving the encoded UCI bit sequence on a determined uplink channel in each of subsequent repetition transmissions of the UCI, comprises:
   if a transmission resource required by the encoded UCI bit sequence is larger than a transmission resource for transmitting the UCI on the determined uplink channel in each of subsequent repetition transmissions of the UCI, performing, by the network-side device, merge processing on the encoded UCI bit sequence; or
   if a transmission resource required by the encoded UCI bit sequence is smaller than a transmission resource for transmitting the UCI on the determined uplink channel in each of subsequent repetition transmissions of the UCI, performing, by the network-side device, deduplication processing on the encoded UCI bit sequence.

5. The method of claim 4, further comprising:
in a case that there is a time-domain overlapping between a Physical Uplink Shared Channel, PUSCH, and a PUCCH for carrying the UCI during the first transmission of the UCI repetition transmission, and it is determined that the UCI is transmitted on the PUSCH, determining that the encoded UCI bit sequence in the first transmission is determined based on a transmission resource for transmitting the UCI on the PUSCH; or
in a case that there is a time-domain overlapping between a PUSCH and a PUCCH for carrying the UCI during the first transmission of the UCI repetition transmission, and it is determined that the UCI is transmitted on the PUCCH, determining that the encoded UCI bit sequence in the first transmission is determined based on a transmission resource for transmitting the UCI on the PUCCH; or
in a case that no PUSCH exits during the first transmission of the UCI repetition transmission, determining that the UCI is transmitted on a PUCCH for the UCI repetition transmission, and determining that the encoded UCI bit sequence in the first transmission is determined based on a transmission resource for transmitting the UCI on the PUCCH.

6. The method of claim 4, wherein in each of subsequent repetition transmissions of the UCI, the network-side device determines the uplink channel for receiving the encoded UCI bit sequence by:
if no PUSCH exits during a repetition transmission of the UCI, determining, by the network-side device, a PUCCH for the UCI repetition transmission as the uplink channel for receiving the encoded UCI bit sequence; or
if there is a time-domain overlapping between a PUSCH and a PUCCH for the UCI repetition transmission during a repetition transmission of the UCI, and a start symbol of the PUCCH is aligned with or ahead of a start symbol of the PUSCH, determining, by the network-side device, the PUSCH as the uplink channel for receiving the encoded UCI bit sequence; or
if there is a time-domain overlapping between a PUSCH and a PUCCH for the UCI repetition transmission during a repetition transmission of the UCI, and a start symbol of the PUCCH is behind a start symbol of the PUSCH, determining, by the network-side device, the PUCCH as the uplink channel for receiving the encoded UCI bit sequence.

7. An apparatus for transmitting uplink control information, wherein the apparatus is a terminal which comprises a processor and a memory;
wherein the processor is configured to read a program in the memory and perform:
determining an encoded Uplink Control Information, UCI, bit sequence in a first transmission of UCI repetition transmission, wherein the UCI is configured with repetition transmission using a Physical Uplink Control Channel, PUCCH occupying multiple slots, and the UCI is repeated in each of the multiple slots; wherein the encoded UCI bit sequence is determined based on a transmission resource for transmitting the UCI on an uplink channel used in the first transmission;
transmitting the encoded UCI bit sequence on a determined uplink channel in each of subsequent repetition transmissions of the UCI;

wherein the processor is configured to perform:
if a transmission resource required by the encoded UCI bit sequence is larger than a transmission resource for transmitting the UCI on the determined uplink channel in each of subsequent repetition transmissions of the UCI, performing truncation processing on the encoded UCI bit sequence; or
if the transmission resource required by the encoded UCI bit sequence is smaller than the transmission resource for transmitting the UCI on the determined uplink channel in each of subsequent repetition transmissions of the UCI, performing repeat processing on the encoded UCI bit sequence.

8. The apparatus of claim 7, wherein the processor is further configured to perform:
in a case that there is a time-domain overlapping between a Physical Uplink Shared Channel, PUSCH, and a PUCCH for carrying the UCI during the first transmission of the UCI repetition transmission, and it is determined that the UCI is transmitted on the PUSCH, determining the encoded UCI bit sequence in the first transmission based on a transmission resource for transmitting the UCI on the PUSCH; or
in a case that there is a time-domain overlapping between a PUSCH and a PUCCH for carrying the UCI during the first transmission of the UCI repetition transmission, and it is determined that the UCI is transmitted on the PUCCH, determining the encoded UCI bit sequence in the first transmission based on a transmission resource for transmitting the UCI on the PUCCH; or
in a case that no PUSCH exits during the first transmission of the UCI repetition transmission, determining that the UCI is transmitted on a PUCCH for the UCI repetition transmission, and determining the encoded UCI bit sequence in the first transmission based on a transmission resource for transmitting the UCI on the PUCCH.

9. The apparatus of claim 7, the processor is configured to perform:
if no PUSCH exits during a repetition transmission of the UCI, determining a PUCCH for the UCI repetition transmission as the uplink channel for transmitting the encoded UCI bit sequence; or
if there is a time-domain overlapping between a PUSCH and a PUCCH for the UCI repetition transmission during a repetition transmission of the UCI, and a start symbol of the PUCCH is aligned with or ahead of a start symbol of the PUSCH, determining the PUSCH as the uplink channel for transmitting the encoded UCI bit sequence; or
if there is a time-domain overlapping between a PUSCH and a PUCCH for the UCI repetition transmission during a repetition transmission of the UCI, and a start symbol of the PUCCH is behind a start symbol of the PUSCH, determining the PUCCH as the uplink channel for transmitting the encoded UCI bit sequence.

10. An apparatus for transmitting uplink control information, wherein the apparatus is a network-side device which comprises a processor and a memory;
wherein the processor is configured to read a program in the memory and perform the method of claim 4.

11. The apparatus of claim 10, wherein the processor is further configured to perform:
in a case that there is a time-domain overlapping between a Physical Uplink Shared Channel, PUSCH, and a PUCCH for carrying the UCI during the first transmission of the UCI repetition transmission, and it is determined that the UCI is transmitted on the PUSCH, determining that the encoded UCI bit sequence in the first transmission is determined based on a transmission resource for transmitting the UCI on the PUSCH; or in a case that there is a time-domain overlapping between a PUSCH and a PUCCH for carrying the UCI during the first transmission of the UCI repetition transmission, and it is determined that the UCI is transmitted on the PUCCH, determining that the encoded UCI bit sequence in the first transmission is determined based on a transmission resource for transmitting the UCI on the PUCCH; or in a case that no PUSCH exits during the first transmission of the UCI repetition transmission, determining that the UCI is transmitted on a PUCCH for the UCI repetition transmission, and determining that the encoded UCI bit sequence in the first transmission is determined based on a transmission resource for transmitting the UCI on the PUCCH.

12. The apparatus of claim 10, wherein the processor is configured to perform:

if no PUSCH exits during a repetition transmission of the UCI, determining a PUCCH for the UCI repetition transmission as the uplink channel for receiving the encoded UCI bit sequence; or if there is a time-domain overlapping between a PUSCH and a PUCCH for the UCI repetition transmission during a repetition transmission of the UCI, and a start symbol of the PUCCH is aligned with or ahead of a start symbol of the PUSCH, determining the PUSCH as the uplink channel for receiving the encoded UCI bit sequence; or if there is a time-domain overlapping between a PUSCH and a PUCCH for the UCI repetition transmission during a repetition transmission of the UCI, and a start symbol of the PUCCH is behind a start symbol of the PUSCH, determining the PUCCH as the uplink channel for receiving the encoded UCI bit sequence.

13. A non-transitory readable storage medium, wherein the readable storage medium comprises program codes which are configured, when running on a computing device, to cause the computing device to perform the steps of the method of claim 1.

14. A non-transitory readable storage medium, wherein the readable storage medium comprises program codes which are configured, when running on a computing device, to cause the computing device to perform the steps of the method of claim 4.

* * * * *